United States Patent [19]

Jones et al.

[11] Patent Number: 4,750,112
[45] Date of Patent: Jun. 7, 1988

[54] DATA PROCESSING APPARATUS AND METHOD EMPLOYING INSTRUCTION PIPELINING

[75] Inventors: Walter A. Jones, Chelmsford; Paul R. Jones, Jr., Northboro; Joseph L. Ardini, Jr., Needham, all of Mass.

[73] Assignee: Prime Computer, Inc., Natick, Mass.

[21] Appl. No.: 921,834

[22] Filed: Oct. 23, 1986

Related U.S. Application Data

[63] Continuation of Ser. No. 579,040, Feb. 10, 1984, abandoned.

[30] Foreign Application Priority Data

Jul. 11, 1983 [WO] World Int. Prop. O...PCT/US83/01052

[51] Int. Cl.⁴ ............................ G06F 9/38; G06F 9/42
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 3,840,861 | 10/1974 | Amdahl et al. | 364/200 |
| 3,940,741 | 2/1976 | Horikoshi et al. | 364/200 |
| 4,025,771 | 5/1977 | Lynch, Jr. et al. | 364/200 |
| 4,075,688 | 2/1978 | Lynch, Jr. et al. | 364/200 |
| 4,110,822 | 8/1978 | Ponter et al. | 364/200 |
| 4,187,539 | 2/1980 | Eaton | 364/200 |
| 4,197,578 | 4/1980 | Wada et al. | 364/200 |
| 4,200,927 | 4/1980 | Hughes et al. | 364/200 |
| 4,245,304 | 1/1981 | Porter et al. | 364/200 |
| 4,251,859 | 2/1981 | Momose et al. | 364/200 |
| 4,287,561 | 9/1981 | Liptay | 364/200 |
| 4,305,124 | 12/1981 | Marro et al. | 364/200 |
| 4,316,244 | 2/1982 | Grondalski | 364/200 |
| 4,354,225 | 10/1982 | Frieder et al. | 364/200 |
| 4,365,311 | 12/1982 | Fukunaga et al. | 364/900 |
| 4,370,711 | 12/1983 | Smith | 364/200 |
| 4,373,180 | 2/1983 | Linde | 364/200 |
| 4,402,042 | 8/1983 | Guttag | 364/200 |
| 4,439,827 | 3/1984 | Wilkes | 364/200 |
| 4,454,578 | 6/1984 | Matsumoto et al. | 364/200 |
| 4,467,414 | 8/1984 | Akagi et al. | 364/200 |
| 4,471,432 | 9/1984 | Wilhite et al. | 364/200 |

OTHER PUBLICATIONS

IBM; *Computer Structures: Principles and Examples;* McGraw-Hill; 1982; Chapter 18—pp. 276-292; (1967).

"A Study of Branch Prediction Strategies", James E. Smith, *The 8th Annual Symposium on Computer Architecture,* May 12-14, 1981, pp. 135-148.

"Technique for Minimizing Branch Delay Due to Incorrect Branch History Table Predictions", G. S. Rao, *IBM Technical Disclosure Bulletin,* vol. 25, No. 1, Jun. 1982, pp. 97-98.

"Generalized History Table for Branch Prediction", J. J. Losq, *IBM Technical Disclosure Bulletin,* vol. 25, No. 1, Jun. 1982, pp. 99-101.

"Target Prefetch Table", L. Parks et al, *IBM Technical Disclosure Bulletin,* vol. 25, No. 4, Sep. 1982, pp. 2128-2129.

*The Architecture of Pipelined Computers,* Peter M. Kogge, Hemisphere Publishing Corporation, pp. 230-247.

*Primary Examiner*—Gary V. Harkcom
*Assistant Examiner*—C. H. Lynt
*Attorney, Agent, or Firm*—Lahive & Cockfield

[57] ABSTRACT

A data processing system for processing a sequence of program instructions has two independent pipelines, an instruction pipeline and an execution pipeline. Each pipeline has a plurality of serially operating stages. The instruction stages read instructions from storage and form therefrom address data to be employed by the execution pipeline. The execution pipeline receives the address data and uses it for referencing stored data to be employed for execution of the program instructions. Both pipelines operate synchronously under the control of a pipeline control unit which initiates operation of at least one stage of the execution pipeline prior to completion of the instruction pipeline for a particular instruction. Thereby operation of at least one instruction stage and one execution stage of the respective pipelines overlap for each program instruction. The instruction and execution pipelines share high speed memory. The pipeline control unit can independently control the flow of instructions through the two pipelines. This is important for operation in conjunction with a microcode storage element which allows conditional branching and subroutine operation. Circuitry also detects pipeline collisions and exception conditions and delays or inhibits operation of one or more of the pipeline stages in response thereto. Under control of the pipeline control unit, one of the independent pipelines can operate while the other is halted.

32 Claims, 12 Drawing Sheets

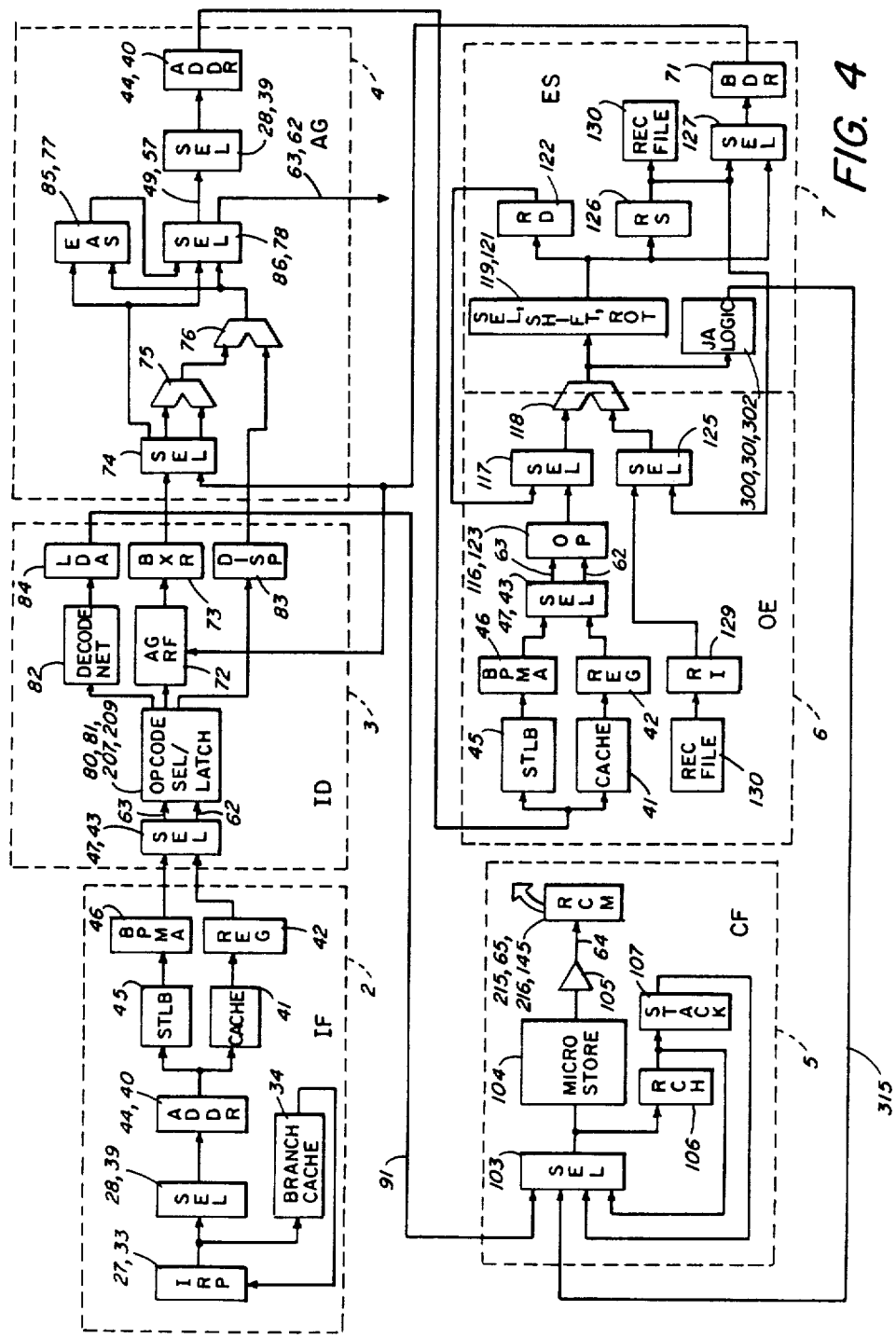

DATA PROCESSING APPARATUS AND METHOD EMPLOYING INSTRUCTION PIPELINING

This application is a continuation of application Ser. No. 579,040, filed 2/10/84; now abandoned.

BACKGROUND OF THE INVENTION

The present invention relates to the field of digital computers and, in particular, to apparatus and methods for processing instructions in high speed data processing systems.

Data processing systems generally include a central processor, an associated storage system (or main memory), and peripheral devices and associated interfaces. Typically, the main memory consists of relatively low cost, high-capacity digital storage devices. The peripheral devices may be, for example, non-volatile semi-permanent storage media, such as magnetic disks and magnetic tape drives. In order to carry out tasks, the central processor of such systems executes a succession of instructions which operate on data. The succession of instructions and the data those instructions reference are referred to as a program.

In operation of such systems, programs are initially brought to an intermediate storage area, usually in the main memory. The central processor may then interface directly to the main memory to execute the stored program. However, this procedure places limitations on performance due principally to the relatively long times required in accessing that main memory. To overcome these limitations a high speed (i.e. relatively fast access) storage system, in some cases called a cache, is used for holding currently used portions of programs within the central processor itself. The cache interfaces with main memory through memory control hardware which handles program transfers between the central processor, main memory and the peripheral device interfaces.

One form of computer, typically a "mainframe" computer has been developed in the prior art to concurrently hardware process a succession of instructions in a so-called "pipeline" processor. In such pipeline processors each instruction is executed in part at each of a succession of stages. After the instruction has been processed at each of the stages, the execution is complete. With this configuration, as an instruction is passed from one stage to the next, that instruction is replaced by the next instruction in the program. Thus, the stages together form a "pipeline" which, at any given time, is executing, in part, a succession of instructions. Such instruction pipelines for processing a plurality of instructions in parallel are found in several mainframe computers. These processors consist of single pipelines of varying length and employ hardwired logic for all data manipulation. The large quantity of control logic in such machines makes them extremely fast, but also very expensive.

Another form of computer system, typically a "minicomputer," incorporates microcode control of instruction execution. Generally, under microcode control, each instruction is fully executed before execution of the next instruction begins. Microcode-controlled execution does not provide as high performance (principally in terms of speed) as hardwired control, but the microcode control does permit significant cost advantages compared to hardwired systems. As a result, microcode control of instruction execution has been employed in many cost-sensitive machines. Microcode reduces the total quantity of hardware in the processor and also allows much more flexibility in terms of adapting to changes which may be required during system operation. Unfortunately, the conventional pipeline techniques for instruction execution are not compatible with the multiple steps which must be performed to execute some instructions in a microcode-controlled environment.

Accordingly, it is an object of the present invention to provide an improved computer system.

Another object is to provide performance characteristics heretofore associated only with mainframes while maintaining a cost profile consistent with the minicomputers.

It is yet another object to provide a computer system incorporating pipelined instruction processing and microcode-controlled instruction execution.

SUMMARY OF THE INVENTION

The invention relates to a data processing system and pipeline control method for processing a sequence of program instructions in a computer. The data processing system has an instruction pipeline having a plurality of serially operating instruction stages for reading instructions from storage and for forming therefrom plural address data to be employed during execution of the program instructions. The data processing system further has an execution pipeline having a plurality of serially operating execution stages for receiving the address data and for employing that data, formed by the instruction pipeline, for referencing stored data to be employed for executing the program instructions.

The data processing system features a pipeline control unit for synchronously operating the instruction pipeline and the execution pipeline. The pipeline control unit has circuitry for initiating operation of at least one stage of the execution pipeline using at least one of the address data formed by the instruction pipeline for program instruction prior to the completion of address data formation by the instruction pipeline for that program instruction. Thereby, operation of at least one instruction stage and one execution stage of the respective pipelines overlaps for each program instruction.

The data processing system further features sharing a memory between the instruction pipeline and the execution pipeline. A pipeline master clock for timing the pipeline stages has at least two clocked periods allotted for each stage of the pipeline to complete its operation. During one of these two clocked periods the instruction pipeline has access to the high speed memory and during another one of the clocked periods the execution pipeline has access to the high speed memory.

The pipeline control unit further has circuitry responsive to exception conditions on the execution and instruction pipelines for independently controlling, for each pipeline, the flow of instruction operations through the execution and instruction pipelines. Flow control of the instructions can include halting one or the other, or both, of the execution and instruction pipelines; running the execution pipeline using artificial "NOP" (no operation) instructions while a previously empty instruction pipeline is being filled; extending the time for all pipeline stages to complete an operation for allowing one of the stages to complete its operations; providing extended time for a plurality of microinstructions to be used in the execution stages of the pipeline; maintaining the instruction pipeline in a halted state; and similarly related delay type operations.

In another aspect of the invention, a pipeline control method for use with an instruction and an execution pipeline having a plurality of serially operating instruction stages, features the steps of synchronously operating the instruction and execution pipelines and initiating operation of at least one stage of the execution pipeline using address data formed by the instruction pipeline at a time prior to completing, by the instruction pipeline, generation of all of the address data formed for a particular program instruction.

BRIEF DESCRIPTION OF THE DRAWINGS

The foregoing and other objects of this invention, the various features thereof, as well as the invention itself, may be more fully understood from the following description, when read together with the accompanying drawings in which:

FIG. 4 shows, in detailed block diagram form, the pipelines of FIG. 1;

DESCRIPTION OF THE PREFERRED EMBODIMENT

Figure 1:
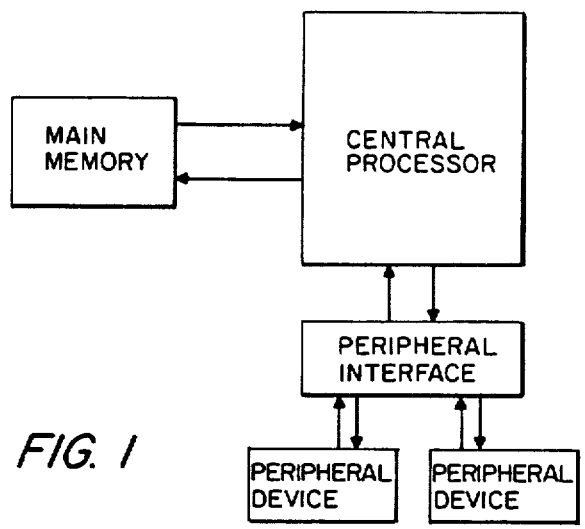
FIG. 1 shows, in block diagram form, an exemplary computer system embodying the present invention.

FIG. 1 shows a computer system embodying the present invention. The system includes a central processor, main memory, peripheral interface and exemplary peripheral devices.

This system of FIG. 1 processes computer data instructions in the central processor which includes instruction pre-processing hardware, local program storage, micro-control store, and execution hardware. The central processor includes two independent pipelines; the Instruction Pipeline (IP) and the Execution Pipeline (EP). In the preferred form, each pipeline is three stages in length (where the processing time associated with each stage is nominally the same), with the last stage of the IP being overlapped with the first stage of the EP.

With this configuration, an instruction requires a minimum of five stage times for completion. All control for advancing instructions through all required stages originates from a Pipeline Control Unit (PCU) in the central processor. The PCU controls the stages to be clocked dynamically, based on pipeline status information gathered from all stages.

This form of the invention processes instructions defined in the System Architecture Reference Guide, 2d Ed. (PRC3060-182) Revision 18, 2, published by Prime Computer, Inc., Natick, Mass., and supports the machine architecture, which includes a plurality of addressing modes, defined in the Reference Guide. In keeping with this architecture, words are 16 bits in length, and double words are 32 bits in length. This form of the invention is optimized to perform address formations including BR+X+D, BR+GRH+D and RP+X+D, where BR (Base Register) is a 32-bit starting address pointer, X (Index) is a 16-bit register, GRH (high side of General Register) is a 16-bit quantity, D (the displacement) is contained explicitly in the instruction and may be either 9 or 16 bits, and RP is the current value of the program counter.

PRINCIPLES OF PIPELINE OPERATION

Pipeline Stage

Figure 1A:
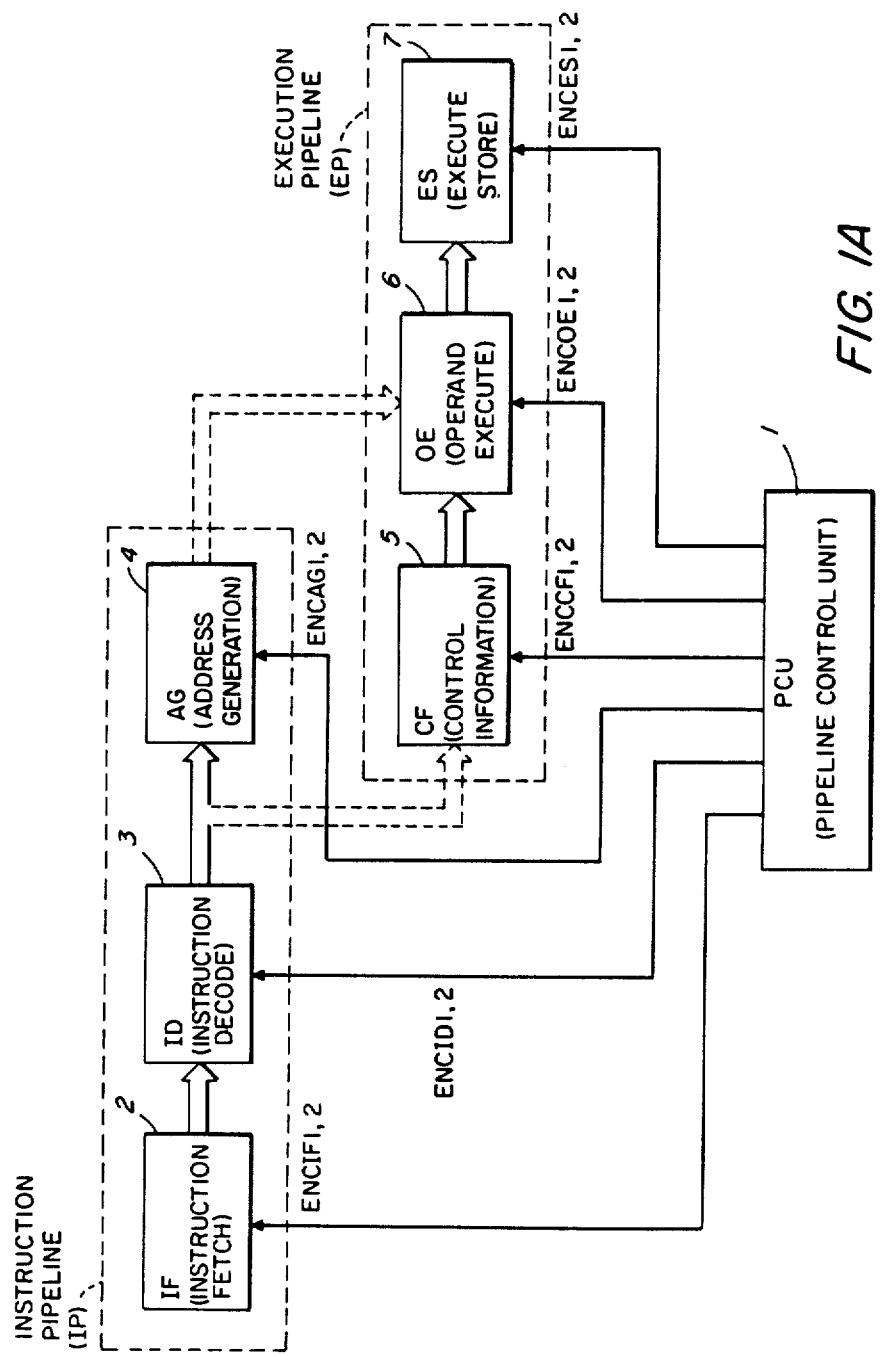
FIG. 1A depicts, in block diagram form, the instruction processor, including the two three-stage pipelines, showing overlap and flow between stages, and the pipeline control unit, of the central processor of the system of FIG. 1.

FIG. 1A shows, in functional block diagram form, two three-stage pipelines, an Instruction Pipeline (IP) and an Execution Pipeline (EP), together with the pipeline control unit (PCU) in the central processor. The Instruction Pipeline includes an Instruction Fetch (IF) stage 2, an Instruction Decode (ID) stage 3, and an Address Generation (AG) stage 4. The Execution Pipeline (EP) includes a Control Formation (CF) stage 5, an Operand Execute (OE) stage 6, and an Execute Store (ES) stage 7. The PCU 1 is depicted in detailed block diagram form in FIGS. 3 and 3A and the IF, ID, AG, CF, OE and ES stages are depicted in detailed block diagram form in FIG. 4.

Figure 2:
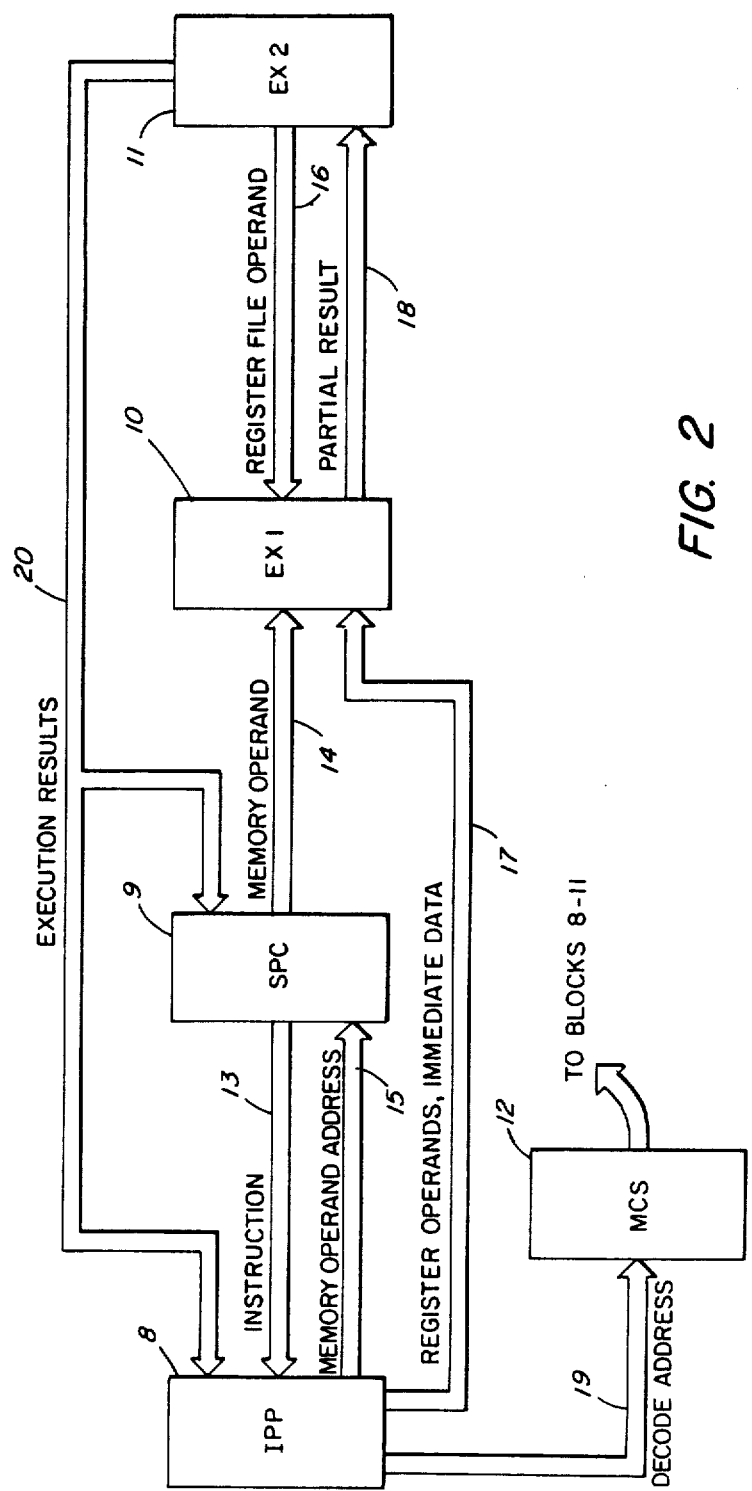
FIG. 2 depicts the five hardware units that form the instruction processor of FIG. 2, showing major data paths for the processing of instructions.

FIG. 2 shows an embodiment of the IP, EP and PCU of FIG. 1A in terms of five hardware units: Instruction Pre-Processor (IPP) 8, Shared Program Cache (SPC) 9, Execution-1 board (EX1) 10, Execution-2 board (EX2) 11, and Micro-Control Store (MCS) 12. The hardware units of FIG. 2 are representative of groupings of the various elements of the IP and EP of FIG. 4. The respective hardware units are shown in detailed form in FIGS. 7-10. In alternative embodiments, other groupings of the various elements of the IP and EP may be used.

Briefly, in the illustrated grouping of FIG. 2, the Shared Program Cache 9 contains local storage and provides instructions by way of bus 13 to the Instruction Pre-Processor 8, and provides memory operands by way of bus 14 to the Execution-1 board 10. The IPP 8 supplies memory operand addresses by way of bus 15 to the SPC 9, register operands and immediate data by way of bus 17 to EX1 10, and control decode addresses by way of bus 19 to the Micro-Control Store 12. EX1 10 operates an memory operands received by way of bus 14 from the SPC 9 and register file operands received by way of bus 16 from the Execution-2 board 11, and transfers partial results by way of bus 18 to EX2 11 for post-processing and storage. EX2 11 also performs multiplication operations. The MCS 12 provides microprogrammed algorithmic control for the four blocks 8–11, while the PCU 1 provides pipeline stage manipulation for all blocks 8-12.

The pipeline stage operations are completed within the various hardware units 8-12 as follows:

IF (Instruction Fetch): A Look-ahead program counter on SPC 9 is loaded into a local general address register; instruction(s) are accessed from a high speed local memory (cache).

ID (Instruction Decode): Instruction data is transferred from SPC to IPP 8; IPP 8 decodes instructions, forming micro-control store entry point information for MCS 12, and accessing registers for address generation in IPP 8.

AG (Address Generation): IPP 8 forms instruction operand address and transfers value to SPC 9 address register.

CF (Control Formation): MCS 12 accesses local control store word and distributes control information to all boards.

OE (Operand Execute): SPC 9 accesses memory data operands in cache; EX1 10 receives memory data operands from SPC 9, register operands from IPP 8, and begins arithmetic operations.

ES (Execute Store): EX1 10 and EX2 11 complete arithmetic operation and store results.

The Address Generation and Control Formation stages are overlapped in time within the data system. The IP and EO operate synchronously under the supervision of the pipeline control unit (PCU) 1, which interfaces to each stage with two enable lines (ENCxx1 and ENCxx2) that provide two distinct clock phase within each stage, as indicated in FIG. 1A. The notation "xx" refers to a respective one of the reference designations IF, ID, AG, CF, OE and ES. The six ENCxx2 lines denote the respective stage operations are complete and the data (or control) processed in those stages are ready for passing to the next stage.

Clocking of Pipeline Stages

Timing and clocking in the dual pipelines (IP and EP) are synchronized by two signals—the master clock MCLK and the enable-end-of-phase signal ENEOP. ENEOP is produced by the Pipeline Control Unit 1 and notifies all boards of the proper time to examine the stage clock enable signal lines (ENCxx1 and ENCxx2) in order to produce phase 1 and phase 2 stage clocks from the master clock MCLK. (See FIG. 6). Pipeline stages always consist of two phases. Phase 1 lasts for exactly two MCLK pulses while phase 2 can last for an arbitrary number of MCLK pulses, as described below, depending on the conditions present in both the IP and the EP.

Figure 6:
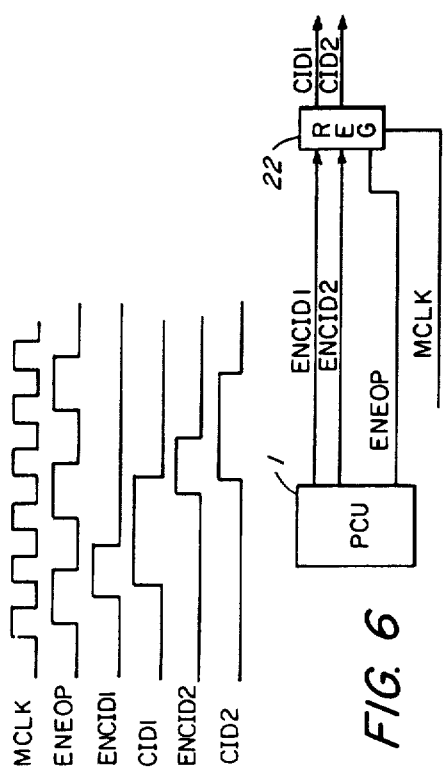
FIG. 6 illustrates the clock generation of the ID stage of the IP pipelines of FIG. 1A.

An example of how MCLK and ENEOP and the stage clock enables interact on each board to form the clocks which define the stage boundaries is shown in FIG. 6 for the Instruction Decode stage 2. Register 22 generates clock signals when enabled by ENEOP. When ENCID1 is present the clock CID1 is generated; when ENCID2 is present, the clock CID2 is generated.

PIPELINE CONTROL UNIT

Figure 3:
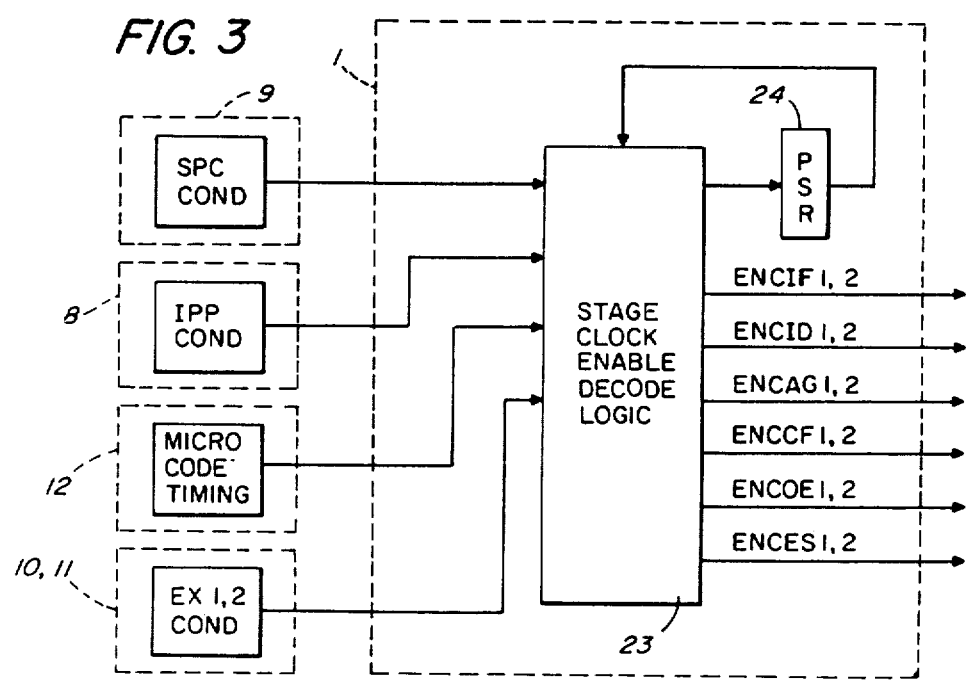
FIG. 3 shows, in block diagram form, the pipeline control unit of FIG. 2.
Figure 3A:
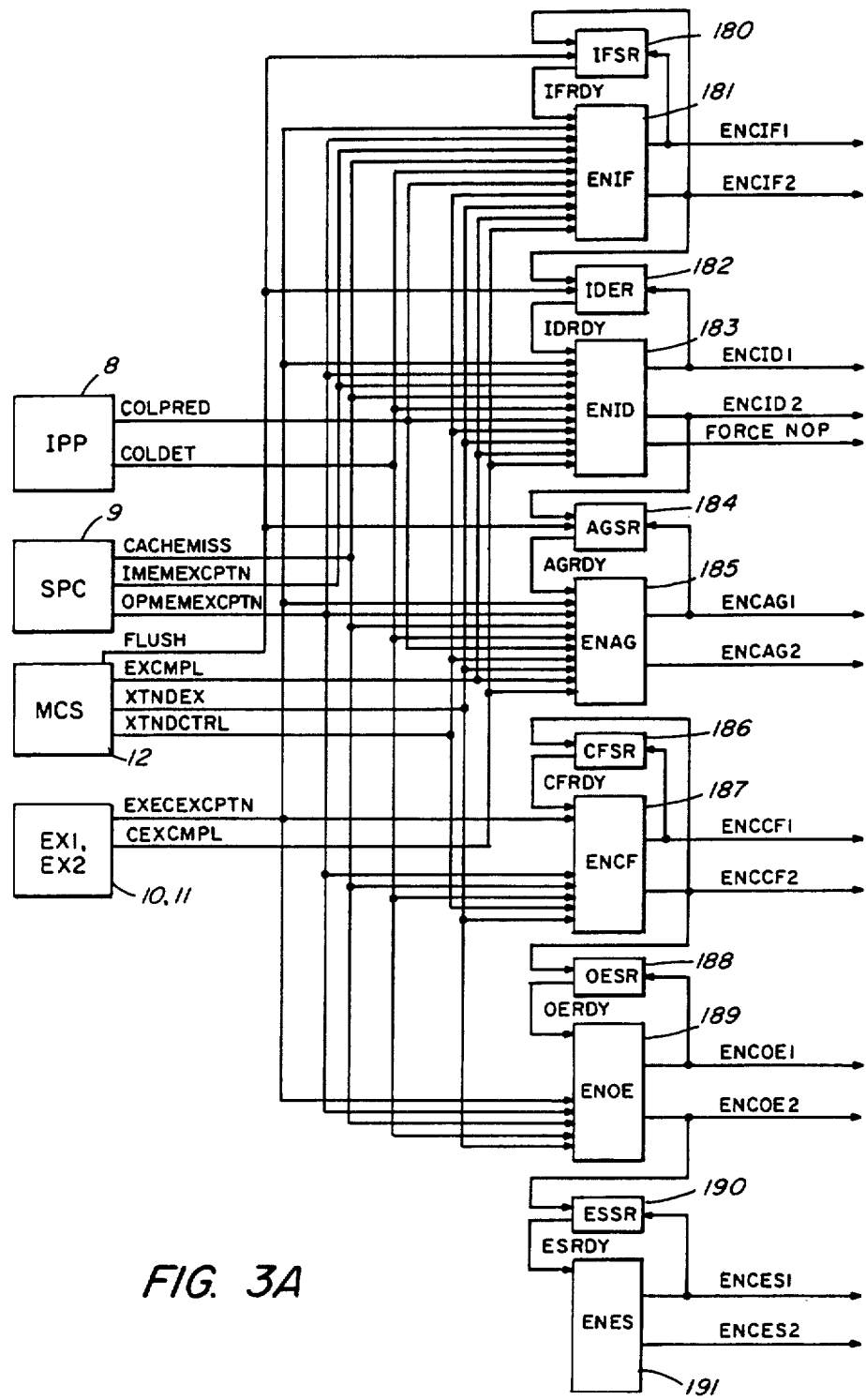
FIG. 3A shows, in block diagram form, the decode logic for the pipeline control unit of FIG. 4.

The Pipeline Control Unit 1 shown in FIGS. 3 and 3A controls the flow of instructions through the dual pipelines (IP and EP) by generating the enable signals for all clocks which defined stage boundaries and relative overlap of the IP and EP. The PCU 1 includes stage clock enable decode logic 23 and the Pipeline State Register (PSR) 24. PCU 1 receives as inputs:

1. Instruction information and exception and register conditions from the IPP 8
2. Exception and cache conditions from the SPC 9
3. Microcode specified timing conditions related to the length of stage OE and the overlap of stage OE and CF from the MCS 12
4. Exception conditions from EX1 10 and EX2 11.

The PCU 1 has complete control of all stage boundaries. With that control:

1. The PCU 1 can hold the IP while cycling multi-microcode through the EP.
2. The PCU 1 can alter the flow of instructions based on control information provided by microcode.
3. The PCU 1 can extend all stages if extra time is required for a particular stage to finish its operation.
4. The PCU 1 can alter the relative overlap of stages OE and CF of the EP in order to allow different types of microcode sequencing (as described below in conjunction with EX1,2).
5. The PCU 1 can flush out instructions in the IP and recycle the IP to load new instructions upon detecting incorrect flow (such as an incorrect flow prediction provided by Branch Cache 34).
6. The PCU 1 can idle the EP with no-operation (NOP) cycles, while cycling the IP, for example, when IRP 27,33 in the SPC 9 is reloaded after an incorrect program flow sequence.
7. The PCU 1 can suspend all pipeline operations during non-overlappable operations such as "cache miss" access to main memory.
8. The PCU 1 can introduce separation between sequential instructions in the IP under certain conditions, such as "collisions" between instructions.
9. The PCU 1 can keep an instruction held in the IF stage upon detecting an instruction-related exception, and then allow the other instructions currently in the pipeline to complete processing so that the exception can be processed in the correct order.

The Pipeline Control Unit (PCU) 1 which controls the clocking of the stages in the IP and EP is shown in detail in FIG. 3A. Condition signals received from the IPP 8, SPC 9, MSC 12, EX1 10, and EX2 11 hardware units are utilized to produce enable signals for clocks in the IF 2, ID 3, AG 4, CF 5, OE 6, and ES 7 stages of the dual pipelines (IP and EP). There are two major elements in PCU 1 which produce the clock enable signals ENCxx1,2: the pipeline state register (PSR) 24 (including state registers 180,182,184,186,188,190) and the stage clock enable decode logic 23 (including combinatorial logic blocks (181,183,185,187,189,191). The state registers 180,182,184,186,188,190 indicate that the respective pipeline stages are ready to be enabled. if there are no conditions received by the PCU 1 which should inhibit the stage from proceeding. When the stages are in operation, the state registers 180,182,184,196,188,190 provide a timing reference to distinguish between the two phases of each stage. The combinatorial logic blocks 181,183,185,187,189,191 decode the conditions received from the various hardware units 8-11 to determine whether or not the stage operation should proceed.

The values of the state registers are controlled by the various ENCxx1 and ENCxx2 signals as follows:

The IF state register IFSR 180 is set ready by EN-CIF2 indicates that an instruction fetch is completed and another can begin. ENCIF1 sets state register IFSR 180 to indicate that phase 1 of the IF stage has been performed.

The ID state register IDSR 182 is set ready by ENCIF2 which indicates that the IP prefetched an instruction which is ready to be decoded. ENCID1 sets state register IDSR 180 to indicate that phase 1 of the ID stage has been performed.

The AG state register AGSR 184 is set ready by ENCID2 which indicates that the IP has decoded an instruction which now requires an operand address generation. ENCAG1 sets state register AGSR 184 to indicate that phase 1 of the AG stage has been performed.

The CF state register CFSR 186 is set ready by ENCCF2 which indicates that the EP has completed formation of the control word associated with the microinstruction ready to enter the OE stage. ENCCF1 sets state register CFSR 186 to indicate that phase 1 of the CF stage is complete.

The OE state register OESR 188 is set ready by ENCCF2 which indicates that control and addressing information is ready to be passed to the OE stage. ENCOE1 sets state register OESR 188 to indicate that phase 1 of the OE stage is complete.

The ES state register ESSR 190 is set ready by ENCOE2 which indicates that operands are ready to enter the final execution stage and be stored. ENCES1 sets state register ESSR 190 to indicate that phase 1 of the ES stage is complete.

Combinatorial logic networks EN1F 181, ENID 183, ENAG 185, ENCF 187, ENOE 189, and ENES 191 monitor condition signals received from the hardware units 8-11, and when those conditions indicate, block the ENCxx1 and Enxx2 enables for the respective stages. In FIG. 3A, each signal entering the combinatorial logic blocks may inhibit the respective enables for that stage. The condition signals applied to the PCU 1 are described below.

Figure 5:
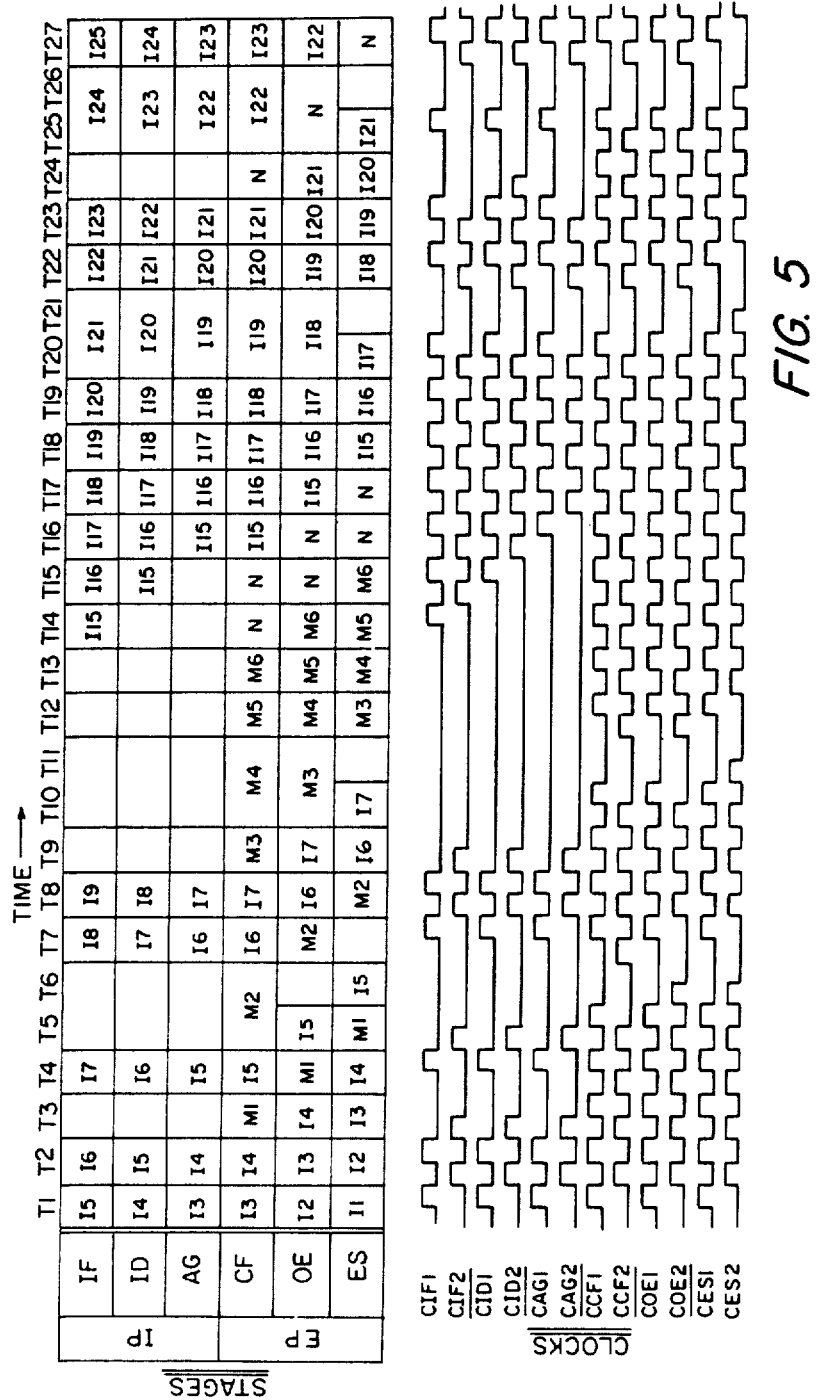
FIG. 5 depicts the flow of instructions through the two pipelines, with examples of alteration to normal processing flow.

The IPP 8 provides two conditions signals to the PCU 1: COLPRED and COLDET. COLPRED (collision predicted) indicates that separation may have to be introduced between two instructions in the IP to allow determination of whether or not a register collision exists. COLPRED holds the IF, ID, and AG stages of the IP to permit determination of whether or not a register collision exists between the instruction in the ID stage and the instruction that has just entered the EP. Logic ENID 183 generates FORCENOP (force a no operation instruction in the CF stage), when no new instruction is available to enter the EP. This signal disables the LDA signal on bus 91 by setting LDA register 84 to zero. COLDET indicates that a collision does exist. In response, the generation of the clock enable signal for stages IF, ID, AG, CF, and OE is delayed until the updated register is available from the completion of the ES stage. This process is illustrated in FIG. 5 during time periods T24, T25, and T26.

SPC 9 provides three condition signals to PCU 1: CACHEMISS, IMEMEXCPTN, OPMEMEXCPTN. CACHEMISS indicates that a cache miss has occured in the SPC 9. In response to the CACHEMISS signal, the generation of the clock enable signals for the stages IF, IO, AG, CF, and OE is delayed until the memory subsystem had updated the cache. the signal IMEMEXCPTN from the SPC 9 indicates that an exception (such as an access violation, STLB miss) has occurred during an instruction fetch. The IMEMEXCPTN signal similarly effectively holds the IF stage from further prefetching and prevents the instruction in the IF stage from proceeding to the ID stages. All other stages are allowed to process, so that the pipeline may be emptied of all instructions before proceeding to handle the exception condition. the OPMEMEXCPTN signal indicates that an exception has occurred during the operand fetch in stage OE. This OPEMEMEXCPTN signal blocks stages IF, ID, AG of the IP and provide sufficient delay for the CF stage as to allow the EP to branch to a microcode routine capable of handling the exception condition. Stage OE, in which the exception occurred, is effectively cancelled.

The MCS 12 provides information decoded from microcode related to the number of microcode-driven execution cycles required to complete an instruction and the timing required for completing data manipulation and formation of micro-control store addresses within such cycles. Three signals within this category are produced. EXCMPL is only asserted on final microsteps of instructions. During all other microsteps of instructions, the PCU 1 holds the IP consisting of stages IF, ID and AG until the multimicrocode has completed. XTNDEX indicates that additional time is required in the OE stage, while XTNDCTRL controls the relative overlap of stages OE and CF, allowing microcode jump conditions to be used in the present microscope to select following microstep. The MCS 12 also produces FLUSH in cases where incorrect instruction flow has occurred, such as when wrong branch cache predictions are made. In response to the FLUSH signal, all IP stages are cleared and a new IF stage is started.

The EX1,2 pair 10,11 produces the signals EXECEXCPN, which is generated under certain execution-related conditions, and CEXCMPL, which indicates whether or not a microinstruction is a final one based on testing bits within EX1,2 10,11. In response to EXECEXCPN, the PCU 1 functions in a similar manner as in response to OPMEMEXCPTN, differing only in the microcode routine which is executed. The CEXCMPL causes the same result as EXCMPL, differing only in that the generation of CEXCMPL is conditioned on certain test bits within EX1,2 10,11.

INSTRUCTION FLOW IN PIPELINES

FIG. 5 shows the flow on instructions through the six stages of the dual pipeline (IP and EP), and shows the clocking associated with those stages. In FIG. 5, T1-T27 are time reference markers; I1-I25 represent machine instructions; M1-M6 represent additional microcode execution cycles required to complete the execution of a machine instruction and N represents a NOP (or "no-operation) instruction cycling through the Execution Pipeline.

Time periods T1 and T2 show the dual pipelines concurrently processing five machine instructions. Instruction 4 requires an additional microcode cycle (M1); during time period T3, the PCU 1 idles the IF, ID, and AG stages of the Instruction Pipeline. During T4, the IP again begins to advance instructions. I5 also requires an extra execution cycle (M2), so that during time periods T5 and T6, the PCU 1 again idles the three stages of the IP. The second microcode step for I5 (i.e M2) is conditional, based on the results of the execution of I5; the PCU 1 therefore stretches the CF stage for M2 relative to the end of the OE stage for I5. Both pipelines are operative again during time periods T7 and T8. I7 is an example of a machine instruction requiring four extra microcode execution cycles (M3, M4, M5, and M6). The PCU 1 begins and continues to idle stages IF, ID, and AG beginning in time period T9. Microcode execution cycle M3 requires additional time in the OE stage, so that PCU 1 extends both the CF and OE stage from T10 to T11.

In the exemplary sequence of FIGS. 5, I7 is a conditional instruction. During the multiple cycles of execution associated with I7 (i.e. M3–M6), the system determines that the IP has prefetched incorrectly. The EP then flushes the pipeline by notifying the PCU and reloading the look-ahead program counter used for prefetching. The IF, ID, and AG stages of the Instruction Pipeline are shown refilling during time periods T14, T15, and T16. While the IP is refilling, the EP completes the last micromode step associated with I7. During time periods T14 and T15, NOP steps are forced into the Execution Pipeline, as no machine instruction is yet available for execution.

I18 is an example of a machine instruction requiring extra time in the OE stage. The PCU also delays the IF, ID, AG, and CF stages of the instructions behind I18 (i.e. I19, I20, and I21) keeping all stages in synchrony.

Time periods T23, T24, T25, and T26 show an example where the IP requests special action in the PCU prior to advancing I22 from the ID stage to the AG stage. In particular, the IP has determined that I21 will modify a register required by I22 to generate the operand address associated with I22. In response, the PCU 1 suspends the IP during time period T24, and delays the IF, ID, and AG stages in the IP and the CF stage in the EP during time periods T25 and T26, so that the results stored for I21 in the ES stage can be used by the AG stage for I22. Because no machine instruction is available at time period T24, a NOP cycle is introduced into the CF stage of the EP.

The phased stage clocks (Cxx1, Cxx2) described in the Pipeline Control unit section are shown beneath the instruction flow diagram in FIG. 5.

PIPELINE ELEMENTS

As described above, FIG. 4 shows the principle hardware elements contained in each of the six stages of the instruction and execution pieplines. In the embodiment of FIG. 2, several of the stages include elements which are time-multiplexed resources within the pipelines. These elements are shown with identical references designations in the various stages of the FIG. 4 configuration.

For a single machine instruction passing through the pipeline stages, the processing occurring within the IF stage is confined to hardware on the SPC 9. During the first phase of the IF stage, the contents of the look-ahead program counter 27,33 are gated through the SPC's address selector 28,39 and loaded into the addres registers 44,40 with clock pulse CIF1. During the second phase, 32 bits of instruction data are retrieved from cache 41 and loaded onto the cache data register 42 with clock pulse CIF2, which terminates the IF stage. The STLB 45 is also accessed during the second phase, loading a mapped physical memory address into register BPMa 46 for possible use in the event data is not contained in cache 41. The branch cache 34 is also checked during the IF stage. As described below in conjunction with FIG. 11, based on the information contained, register IRP 27,33 is either loaded with a new target address or incremented.

During the first phase of the ID stage, the instruction data held in the cache data register 42 is passed through selectors 47,42 on the SPC 9 ensuring that the opcode for the instruction at the current program counter value is presented on bus 63. The thirty two bits of instruction data are passed on buses 62,63 to the opcode latches and selectors 80,81 on the IPP 8; this data is retained on the IPP 8 by clock pulse CID1. During the later phase of the ID stage, opcode information is used to access the microcode entry point for the instruction from the decode net 82 which is loaded into register LDA 84 with clock pulse CID2. Also during the second phase, registers required for memory address generation are accessed from register file AGRF 72 and stored in register BXR 73 with clock pulse CID2. Finally, the displacement required for address generation is transferred from the instruction latches and selectors 80,81,207 and loaded into the pipeline displacement register DISP 83 through selector 209 wich clock pulse CID2. Summarizing, at the end of the ID stage, information for the CF stage and AG stage has been stored in pipeline registers; the machine instruction processing then simultaneously moves into the last (AG) stage of the Instruction Pipeline and the first (CF) stage of the Execution Pipeline.

During the AG stage, the IPP 8 computes the effective address of the memory operand (assuming the instruction being processed requires a memory reference) and loads that address into the address registers on the SPC 9. The operation commences with a selector 74 choosing either the output of register BXR 73, which contains the contents of the appropriate registers accessed during the ID stage, or BDR 71 which contains an updated value of a register (as described in detail below with respect to register bypassing in the IPP section). The first ALU 75 then adds the base register and index register as specified by the instruction and feeds the value into the second ALU 76 where it is combined with displacement offset from register DISP 83. The resulting operand address is passed through selectors 86,78 and sent to the SPC 9 on buses 49,57. Selectors 28,39 on the SPC 9 gate the address to the cache 41 and STLB 45 through address registers 44,40 which are loaded with clock pulse CAG2. A copy of this address is also stored in the IPP 8 in registers EAS 85,77 for later use if the particular machine instruction requires multiple microcode execution cycles.

The CF stage performs the access and distribution of the micro-control store word used for algorithmic control to all hardware units. In the case of a machine level instruction, the entry point from the ID stage is chosen by the selector 103 and presented to the micro-store 104. The output of the microstore is driven to all required hardware units through buffer 105 and loaded into a plurality of control word registers 215,65,216,145 with clock pulse CCF2, which marks the end of the CF stage. Also at the end of the stage, the current microstore address is loaded into the holding register RCH 106 with clock pulse CCF2.

At the end of the AG and CF stage operations, which have occurred in parallel for a machine instruction about to begin execution, all addressing and control information has been stored in registers clocked by CCF2 and CAG2. The OE stage 6 operation, which follows the AG and CF stage operations, has two well marked phases. During the first phase, cache 41 and STLB 45 on the SPC 9 are accessed for the operand fetch. (Note that the system cache 41 is accessed by the OE stage 6 during the first phase of operation and, as noted above, by the IF stage 2 during the second phase of operation. This sharing the system cache is a significant advantage.)

Thirty-two bits of operand data are loaded into the cache data register 42, which is clocked with COE1. The STLB 45 is also accessed during the first clock phase, and loads a mapped physical memory address into register BPMA 46 with the occurrence of clock pulse COE1. The memory address stored in BPMA 46 is for possible use in the event data is not contained in cache 41. Still during the first phase, the register file 130, if the micro-control store word so specifies, is also accessed. The register file operand output is loaded into register RI 129, also clocked at COE1.

During the second phase of operation in the OE stage, memory data from cache is passed through selectors 47, 43 on the SPC 9, to EX1 10 over buses 62, 63, passed through selector 117, and finally is gated to the B leg of the 48 bit ALU 118. This data is latched with clock pulse COE2 to maintain the pipelining in registers OP 116, 123. Also during the second phase, register file data from RI 129 is gated through selector 125 and presented to the A leg of the ALU 118.

The ALU 118 operation completes during the first phase of the ES stage; ALU data is passed through selectors 119,121 for post processing, including shifting, and loaded into registers RD 122 and RS 126 with clock pulse CES1. Finally during the last phase of the pipeline, results of the calculation stored in register RS 126 are written into register file 130 if so specified by the micro-store control word and into register BDR 71 clocked at CES2. Register BDR 71 makes an updated location available to hardware in the ID stage for updating register file AGRF 72 and for bypassing AGRF 72 in calculating an operand address in the AG stage through selector 74.

In cartain cases, a particular machine instruction will require more than one cycle in the EP. In such a case, the PCU 1 will stop providing clock enables to the IP, but continue to cycle the three stages in the EP. The micro-store 104 permits any general purpose algorithm to execute within the EP. Results computed in the OE and ES stages and loaded into registers RD 122 and RS 126 with clock pulse CES1 can be fed back into the ALU 118 via the ALU selectors 117,125, thus enabling data manipulation in successive execution cycles to also be pipelines. In the event that an execution cycle references a register written in the previous cycle, the value in register RS 126, which will be written into the register file 130 during the last phase of the ES stage, can bypass register RI 129 normally used to read register file data and be presented directly to selector 125 and presented to the ALU 118.

DESCRIPTION OF THE HARDWARE UNITS 8–11

Shared Program Cache

Figure 7:
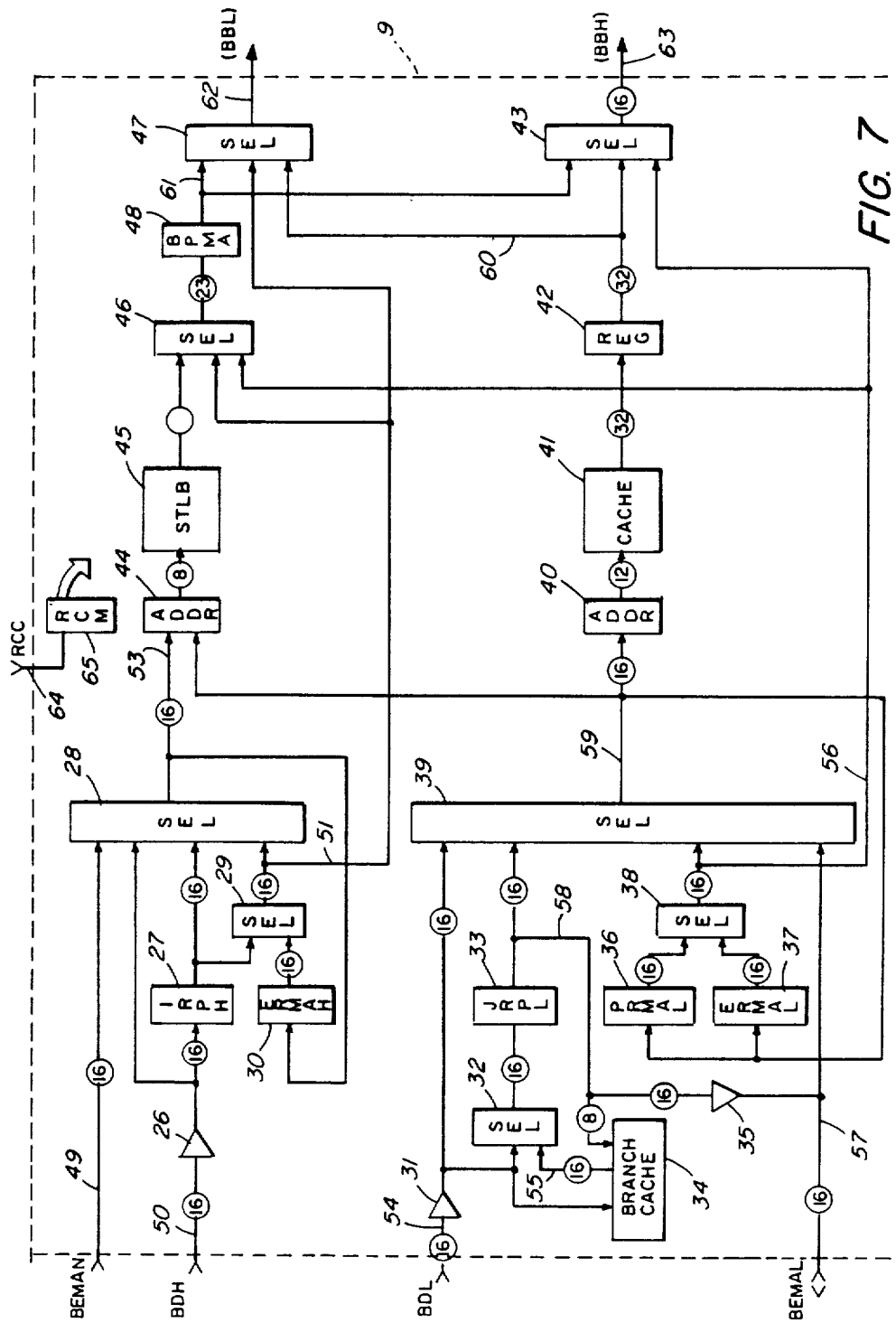
FIG. 7 depicts a block diagram of the Shared Program Cache of FIG. 1A.

The Shared Program Cache 9 in FIG. 7 includes the high speed cache memory 41 for instructions and operands, the segment table look-aside buffer (STLB) 45 for retrieving recently used mapped physical memory addresses, and the branch cache 34 used to predict the flow of conditional machine instructions as they are fetched from cache. Also shown are pipeline address and data registers used in conjunction with the storage elements.

In operation, the SPC 9 operates under the general control of enables from PCU 1, and, during the OE stage, also under the general control of microcode stored in MCS 12, which has been transferred by way of RCC bus 64 to RCM register 65. Selectors 28,39 determine the source for main SPC address busses 53,59 which load address registers 40,44 which in turn directly address the cache 41 and STLB 45. Also loaded from the main address buses 53,59 are backup address registers ERMAH, ERMAL 30,37 for operand addresses and PRMAL 36 for the low side of the program counter. Backup address registers 30,37 provide backup storage of the cache and STLB addresses for use when the contents of the registers 40,44 (which directly access cach 41 and STLB 45) are overwritten with new addresses prior to detection of a cache miss or memory exception.

There are four sources of addresses for accessing the cache and STLB storage elements: (i) registers IRPH 27 and IRPL 33 which contain the look-ahead program counter used for prefetching instructions, (ii) buses BEMAH 49 and BEMAL 57 which transfer effective addresses generated in the IPP 8, (iii) buses BDH 50 and BDL 54 through buffers 26,31 which transfer addresses from EX1 11 during multiple microcode sequences, and (iv) buses 51 and 56 which are used to restore addresses from the program counter backup registers 27,36 or operand address backup registers 30,37 previously used in the event of cache misses or memory exception conditions. Thirty-two bits of information from cache 41 are stored in a data register 42 and gated on bus 60 to selectors 43,47, from which data is driven to EX1 10 and instructions are sent to the IPP 8 over buses BBH and BBL 63,62.

In the event of cache misses or explicit main memory requests, virtually mapped physical addresses from the STLB 45 or absolute addresses from the backup registers 27,30 and 36,37 are gated to selector 46 and stored in the BPMA register 48. The physical memory address is then fed through selector 47 and gated on to BBH, BBL 63,62 and transferred to the main memory subsystem. The backup registers 27,36 and 30,37 are also selectively transferred to EX1 10 over buses BBH, BBL 63,62 for fault processing through the appropriate selectors 29,38,47,43.

The branch cache 34 permits non-sequential instruction prefetching based on past occurrences of branching. Briefly, the branch cache 34 is addressed by the low-side of the look-ahead program counter IRPL 33; the output from that operation consists of control information indicating whether or not to re-load IRPL 33 with a new target address on bus 55 through selector 32. As described in detail below, the information in the branch cache 34 is maintained by the execution hardware and is updated along with IRPL 33 by way of bus BDL 54 whenever it is determined (in IPP 8) that incorrect prefetching has occurred. In the event the branch cache 34 does not indicate that the prefetch flow should be altered, program counter IRPL 33 is then incremented. When the branch cache 34 does alter program flow, the new contents of IRPL 33 are gated onto bus BEMAL 57 by way of buffer 35 and sent to the IPP 8 for variable branch target validation.

Instruction Pre-Processor

Figure 8:
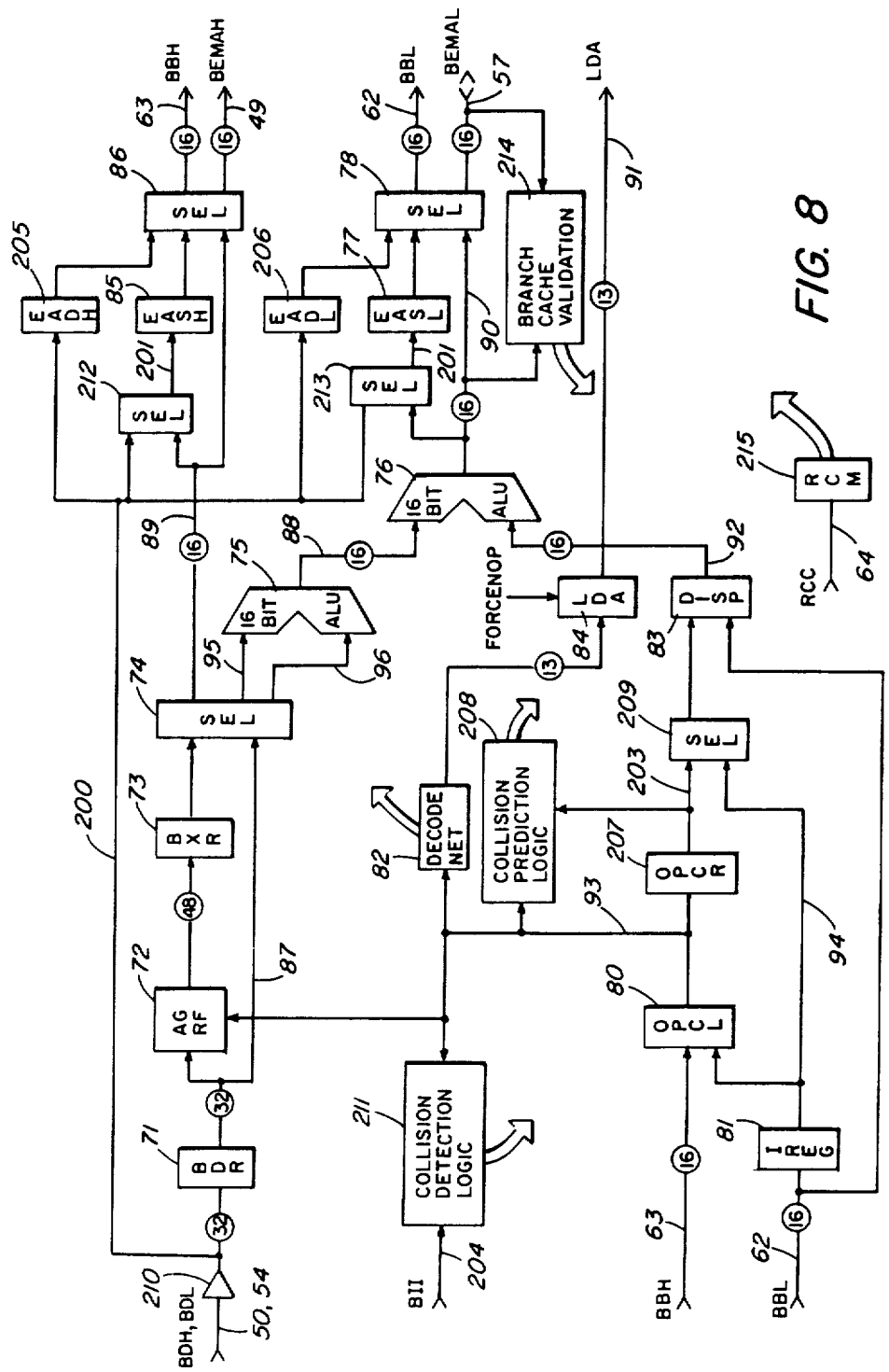
FIG. 8 depicts a block diagram of the Instruction Pre-Processor of FIG. 1A.

The Instruction Pre-Processor (IPP) 8 shown in FIG. 8 includes instruction alignment logic, decoding hardware, arithmetic units for address generation, and registers for preserving addresses transferred to the SPC 9. The input logic of the IPP 8 is adapted to process one- and two-word instruction formats and to accommodate the instruction fetching in the SPC 9 which is always aligned on an even two-word boundary. In either instruction format, the first word always contain the opcode and addressing information; for one-word instructions the displacement for address offset is also contained in the same word; for two-word instructions, the displacement is contained in the second word.

In instruction prefetching operation, the IPP 8 operates under the control of the enables received from PCU 1; during processing of multiple execution cycles, registers are updated and manipulated under the general control of microcode stored in MCS 12, which has been transferred by way of RCC bus 64 to RCM register 215. The SPC 9 transfers two words of instruction information to the IPP 8 over buses BBH 63 and BBL 62. The two words of instruction data presented to the IPP 8 can be various combinations, such as two one-word instructions, an aligned (even boundary) two-word instruction, or the second word of a two-word instruction and the next one-word instruction. The SPC 9 gates the opcode of the instruction associated with the current value of the program counter IRPL 33 onto BBH 63 where it passes through the OPCL 80 selector latch for immediate processing.

The contents of BBL 62 are stored in register ireg 81; depending on whether or not this second word contains an opcode or a displacement, the contents of IREG 81 are gated by way of bus 94 to the OPCL 80 latch, or to the selector 209. The output of the OPCL 80 latch is transferred by way of bus 93 to the decode net 82, the opcode register OPCR 207, the address inputs of register file AGRF 72 and register bypass blocks (including collision prediction logic 208 and collision detection logic 211). The decode net 82 provides control information for countinuing the pre-processing of the instruction and also provides a micro-control store entry point which is stored in the LDA register 84 and subsequently driven to the MCS 12 over the bus LDA 91. The register bypass blocks are described in detail below.

Information decoded from the instruction governs if and how the operand address should be formed. Depending on whether an instruction contains one or two words, the selector 209 chooses either OPCR 207 on bus 203 or of the IREG 81 on bus 94. If the instruction in stage IF is two words and unaligned, its displacement does not arrive from the SPC 9 until it has processed to stage ID. In this case, the DISP selector latch 83 selects a displacement value directly from bus BBL 62. Otherwise, latch 83 selects a displacement value from selector 209. The displacement value from latch 83 is coupled by way of bus 92 to the B-leg of ALU 76.

The IPP 8 includes the register file AGRF 72 which contains copies of all registers used in address calculation. The AGRF 72 can simultaneously access 32 bit base or general registers and 16 bit index registers transferring them into base and pipeline register 73. The true contents of these registers are maintained by the EX2 11 board in the execution unit and any changes to the registers do not occur until the ES stage of the execution pipeline. At the completion of stage ES, updated register contents are sent over BDH 50 and BDL 54 and through buffer 210 and are loaded into the bus D register BDR 71. The output bus 87 from BDR 71 distributes the contents of that register to the AGRF 72 (for updating register copies) and to the selector 74 (for register bypassing, as described in detail below, in conjunction with FIG. 12).

The collision detection logic 211 compares to AGRF 72 address (as decoded from the instruction in stage ID) to the address used by EX2 11 (as received by the IPP 8 over bus BII 204) to write its register file. If the collision detection logic 211 determines that EX2 11 has updated a base, index or general register which matches the one just loaded from AGRF 72 into BXR 73, logic 211 selects the new register value held in BDR 71 in place of the output of BXR 73 by controlling selector 74.

Collision prediction logic 208 predicts possible collisions between instructions which are one stage apart in the IP by comparing the address being read from the AGRF 72 with a "guess" of a written address derived from bus 203. If a possible collision is discovered, the PCU 1 is notified to separate the two instructions by one additional stage time so that the collision detection logic 211 can determine whether a problem actually exists. This technique of register bypassing is described more fully below.

As described fully below, selector 74 selectively gates the high word of the base or general register (as fetched from the AGRF 72) over bus 89 to selectors 212 and 86. The low word of the base or general register on bus 95 and the index register value on bus 96 are added together in the indexing ALU 75 if this operation is specified by the instruction. The displacement ALU 76 adds the result from the indexing ALU 75 to the displacement transferred from DISP 83 on bus 92. The result from ALU 76 is transferred to bus 90 to selectors 78 and 213 and to the branch cache validation logic 214.

The branch cache validation logic 214 compares the computed branch address on bus 90 to the predicted address from the branch cache 34 sent from the SPC 9 over bus BEMAL 57.

The effective address source registers (EASH 85 and EASL 77) and effective address destination registers (EADH 205 and EADL 206) function as two 32-bit memory address pointers, the low word of which (i.e. EASL 77 and EADL 206) are counters. EADH 205 and EADL 206 are loaded from bus 200. EASH 85 and EASL 77 are loaded from selector 212 over bus 201 and selector 213 over bus 202 respectively. Busses BBH 63 and BBL 62 are coupled to the outputs of selector 86 and 78 respectively, and provide general register and immediate operands to EX1 10. Busses BEMAH 49 and BEMAL 57 are similarly coupled to the output of selectors 86 and 78, respectively and provide memory addresses to the SPC 9 for referencing cache 41 and STLB 45. Data on busses 89 and 90 are transferred over busses BEMA 49,57 during stage AG of the IP by selectors 86 and 78. During microcode controlled memory accesses, either EAS 85,77 or EAD 205,206 can be selected. Either EAS 85,77 or EAD 205,206 can also be selected onto busses 63,62 by selectors 86 and 78.

Micro-Control Store

Figure 9:
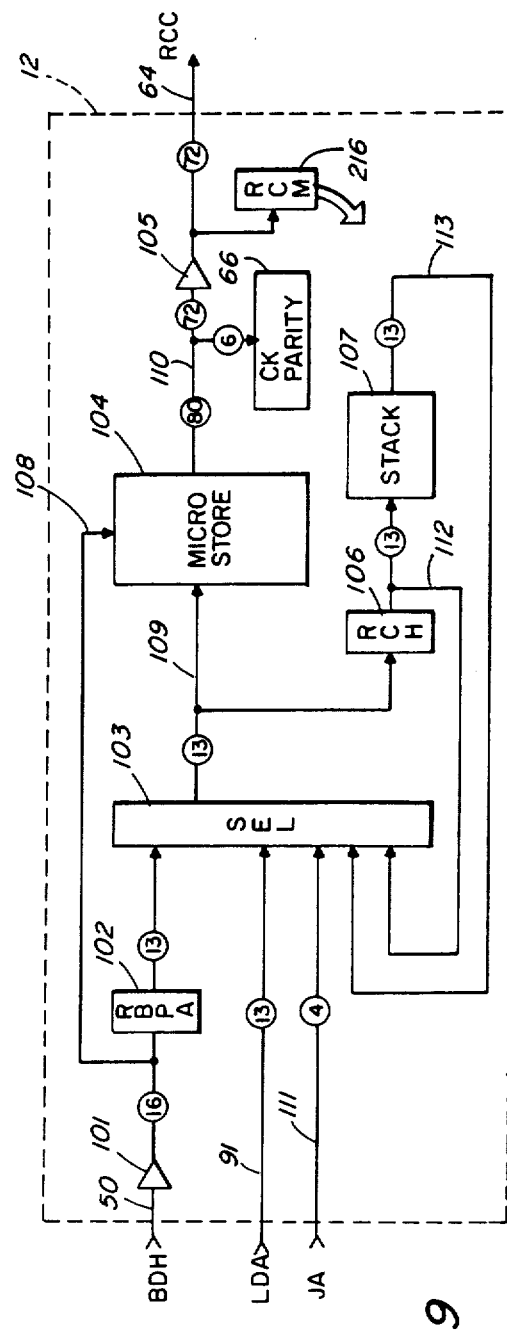
FIG. 9 depicts a block diagram of the Micro-Control Store of FIG. 1A.

The micro-control store unit 12 of FIG. 9 includes microcode storage 104, the next microcode address selector 103, the RBPA register 102, the present micro-address register RCH 106, the microcode stack 107, and the buffers 105 for driving new control bits (RCC's) by way of bus 64 to all boards.

The microstore 104 can be selectively loaded to contain 5K 80 bit microcode words as provided over bus 108 from the BDH bus 50 by way of buffer 101. Of the 80 bits in each microcode word, 8 bits are directed to parity checking network 66, and the remaining 72 bits are transferred to the IPP 8, SPC 9, EX1 10 and EX2 11 for algorithmic control during execution cycles. The microstore 104 and RCH 106 are addressed by way of bus 109. Bus 109 is driven by selector 103 which selects among the various sources for generating next addresses. These sources include the RBPA register 102 (which is used during microcode loads), the LDA bus 91 (which provides decode addresses from the IPP 8), the jump address signals from JA bus 111 (which provide conditional sequencing information from EX1 10), the output bus 112 from RCH 106 which contains the present micro-address), and bus 113 from the output of the microcode stack 107. This stack 107 holds addresses which are used to return from a microcode subroutine or from a microcode fault or exception sequence. The stack 107 can contain up to 16 addresses at once in order to handle cases such as subroutine calls within subroutines. The 72-bit control output bus 110 of the microstore 104 is driven by way of buffers 105 over the RCC bus 64 to units 8-11 to provide microcode control of those units.

Execution 1 and Execution 2

The execution unit of the present embodiment performs the data manipulation and write-storage portions of all instructions which proceed through the dual pipeline (IP and EP). Among the data types supported by this execution unit are:

1. 16 and 32-bit fixed point binary
2. 24-bit fraction/8-bit exponent floating point (single precision)
3. 48-bit fraction/16-bit exponent floating point (double precision)
4. 96-bit fraction/16-bit exponent floating point (quad precision)
5. Varying length 8-bit character strings
6. Varying length 4 or 8-bit decimal digit strings In the present embodiment the execution unit is located on two boards: EX1 10 and EX2 11. The execution unit operates under the control of microcode stored on the MCS 12. The microcode control bits are loaded into the RCM register 145 from bus 64. The execution portion of a machine instruction may require one or many micro-instructions to complete. A new microinstruction is fetched from the MCS 12 for each new data manipulation performed by EX1 10 and EX2 11.

The execution unit includes the general purpose 48-bit ALU 118 with an A-leg input and a B-leg input, selectors 117,125 for choosing among a plurality of operands for input to either the A- or B-leg, a selector 121 for supporting operations on various data types, decimal and character string processing support networks 119,120,131, registers RS 126 and RD 122 for temporary data storage, a register file 130 and multiply hardware 133,146,147.

In the present embodiment, the ALU 118 is adapted to operate on data types up to 48 bits wide and provides a plurality of arithmetic and logical modes. Arithmetic modes include both binary and binary coded decimal types. The ALU 118 operates in concert with shift rotate network 119 and decimal network 120 to adaptively reconfigure in a manner permitting processing the various data types which must be processed.

The register file 130 supports separate read (source) and write (destination) addresses for the instruction. The file 130 is 256 locations deep and generally operates at a 32-bit wide file. In floating point arithmetic, field address register manipulation and certain other special cases, it supports a full 48-bit data path. An RF source decode 303 generates addresses for reading the register file 130 during the first phase of the OE stage while the RF destination decode 304 generates addresses for writing to the file 130 during the second phase of the ES stage. The RF destination decode 304 also transfers register update information to the collision detection logic 211 on the IPP 8 via bus BII 204. Selector 307 chooses between read and write addresses and sends those addresses to the register file 130.

The multiply hardware 133 consists of a 48-bit combination carry propagate/carry save adder. This adder 133 is combined with the sum register 146 and the carry register 147 to perform multiplications up to 48-by-48 bits by a shift and add technique. Each iteration of the multiply hardware 133 processes two bits of operand and generates two bits of sum and one bit of carry. The carry bit between the two sum bits is allowed to propagate.

Busses BBH 63 and BBL 62 supply to the execution unit either a memory operand from the SPC 9 or a register or immediate operand from the IPP 8. This operand is latched in OPH 116 and OPL 123 which in turn feed the B-leg selector 117 by way of busses 134 and 144 respectively. When the operand supplied over BBH 63 and BBL 62 is an unpacked 8-bit decimal digit data type, the decimal support logic 131 converts to the corresponding packed (4-bit) decimal data type. The selector 117 selects from the destination register RD 122, OPH 116 and OPL 123 to drive the bus 135 which in turn feeds the B-leg of the main ALU 118. The A-leg selector 125 selects from among the input register RI 124 (which contains operands read from the register file 130), the shifter-register RS 126, the sum bits bus 140 and carry bits bus 141 (output from the multiply hardware 133), the bus 132 (from the low word of the program counter RP 128), and the timer 124a output to drive the 48-bit A-leg ALU bus 143. The timer 124a has two general purpose counting registers used for operating system and performance evaluation support.

Program counter RP 128 is a 16-bit counter which can increment either by one or two depending on the length of the instruction currently in the execution pipeline. If a jump or branch type of instruction is being processed, RP 128 may be loaded. This load occurs conditionally depending on whether the program is actually switching to a new non-sequential address and whether this change of flow was successfully predicted by the branch cache 34 in the SPC 9. As described below, status about the branch cache's prediction associated with the instruction currently in the execution unit is passed to EX1 10 by the IPP 8. In operation, the ALU 118 processes the data on busses 135 and 143 and the result is placed on bus 136. Bus 136 is coupled to the jump condition generation logic 300 which supplies microcode branching bits for loading into the JC REG 301. The contents of the JC REG 301 can effect the formation of the next microcode address either in the micro-instruction which loads it or in the one which immediately follows it. The control is effected by microcode control of the overlap of the OE stage of one instruction with the CF stage of the next one. Selector 302 chooses among a plurality of jump conditions to produce jump address signals which are transferred by way of JA bus 315 to the MCS 12.

Character byte rotation and floating point shifting are performed by the shift/rotate hardware of shift rotate network 119. Additional decimal digit processing, including unpack (convert 4-bit to 8-bit) and nybble rotate, is performed by network 120. The selector 121 chooses among its various sources depending on the data manipulation being performed. Selector 121 drives bus 137 which in turn loads RD 122, RS 136 and RP 128. This bus can also be coupled to busses BDH 50 and BDL 54 by the selector 127. The output bus 138 of RS 126 is selected onto BDL bus 50 and BDL bus 54 by the selector 127 in order to provide update information to the IPP 8 when an instruction completes execution which has modified a register which has a copy in the IPP 8. The output of RS 126 is also used to provide write data for the register file 130, to provide one of the operands to the multiply hardware 133 and as an input to the selector 125.

As described fully below, the use of RS 126 as an input to selector 125 is primarily for register bypassing. The register bypass logic 305 compares the register file source address (from source decode 303) for the instruction in stage OE to the register file destination address (from destination decode 304) for the instruction in stage ES of the execution pipeline. If a match is detected, the contents of RS 126 on bus 138, which contains the data to be written into the register file 130 are selected by 125 (in place of the data read into RI 124 from the register file 130.)

BRANCH CACHE

Figure 11:
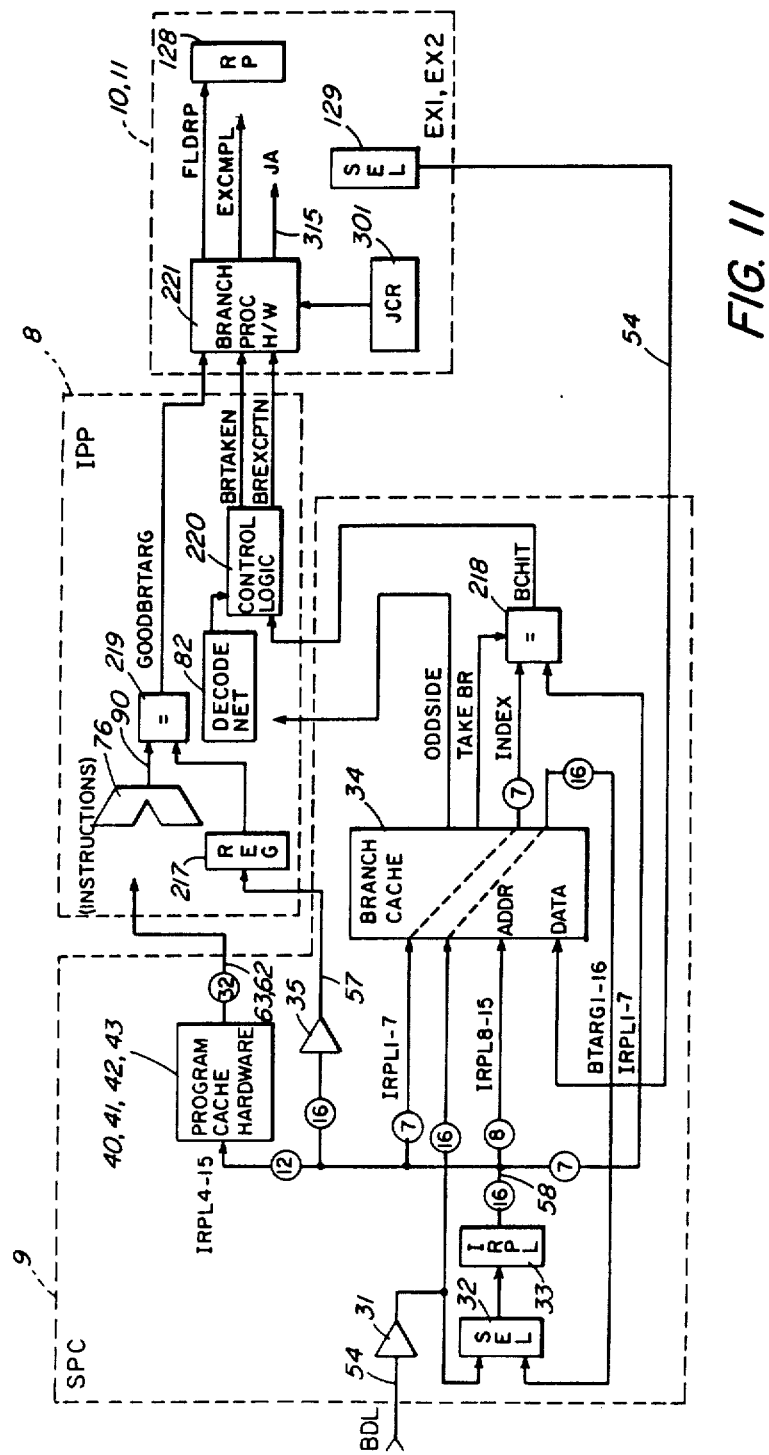
FIG. 11 shows, in block diagram form, the branch cache of the system of FIG. 4.

The branch cache network is shown in FIG. 11. In the present embodiment, as shown in FIG. 11, portions of this network are located units 8-11. The branch cache network is adapted to permit predictions of non-sequential program flow following a given instruction prior to a determination that the instruction is capable of modifying instruction flow. Moreover, the branch cache network does not require computation of the branch address before the instruction prefetching can continue. Generally, the branch cache network makes predictions based solely on the previous instruction locations, thereby avoiding the wait for decode of the current instruction before proceeding with prefetch of the next instruction. Thus, the branch address need not be calculated before prefetching can proceed, since target addresses are stored along with predictions.

In particular, the design of the flow prediction hardware accommodates alterations to the flow of instructions (i.e. branches) without requiring any more time than the simple sequential flow of instructions (i.e. incrementation of the look-ahead program counter). Thus, extra cycles are not required when a discontinuity is encountered in the flow of instructions. This continuation of normal operation results because the branch prediction logic bases its decisions solely on the current look-ahead program counter value (IRPL 33). The logic does not wait for the instruction to be decoded by the ID and AG stages. This structure permits decisions to be made in one pipeline cycle and thus effect changes to the instruction flow very rapidly. Thus the flow redirecting instruction need not be decoded as a branch before instructions are fetched from the branch target.

Referring to FIG. 11, the look-ahead program counter IRPL 33 holds the low order 16 bits of the virtual address of the next instruction to be read from the system cache 41. At the same time as this instruction is being transferred over BBL and BBH 62, 63 to be decoded by the instruction decode ID stage, the branch cache 34 predicts whether the instruction flow should be diverted. If there is no predicted diversion, IRPL 33 simply increments by two. If a diversion is predicted, the output of the branche cache is loaded into IRPL via the selector 32. It is key that the branch prediction is made by the IF stage only, and without any knowledge of the nature of the instruction just fetched (e.g. whether it is a jump or conditional branch instruction). This is especially valuable in a complex instruction-set architecture where instruction decode is a complex task. The branch decision is made at the same time that the transfer of the instruction to the ID stage completes, and before the ID stage has even begun to decode the instruction. The look ahead program counter IRPL loads the redirected value at the same time as it would have done the next increment. This shows that the redirection (JUMP) takes no longer than a simple increment. The IF stage need not wait for feedback from the ID stage, informing it that a branch or jump has been fetched and that it should begin to act. (This is too late to avoid extra delays in the IF stage while it reloads the look-ahead program counter, and refills the pipeline with instructions, overwriting the erroneously fetched instructions which sequentially followed the branch.)

Detailed Explanation of Branch Cache Operation

In operation, the network shown in FIG. 3 begins on the SPC 9 with IRPL 33 accessing the branch cache 34 with same value that is being used to access thirty-two bits of instruction data in the program cache hardware 40,41,42,43. The output of the branch cache 34 includes a prediction bit (TAKEBR) (associated with the last word of a particular branch instruction and which asserts that a branch should be taken), an index (which ensures the entry belongs to the current value of IRPL 33, a 16-bit target address (which will be loaded into IRPL 33 if the control indicates that non-sequential program flow should be followed), and a control line (ODDSIDE) (which indicates which of the two words of instruction data being fetched from the cache 41 a branch directive is associated with). The signal ODDSIDE identifies each entry in the branch cache as being associated with either an odd or even word aligned instruction. In cases where a prediction is made for a two word branch instruction, the prediction entry is always associated with the second word of the instruction in order to ensure that the second word (which is required for calculating the address specified by the branch instruction) is properly fetched into the pipeline. This is described in greater detail below.

Associating the prediction entry with the second word of the instruction ensures that all words of an instruction have been fetched by the IF stage and have been sent to the ID stage before a branch prediction is made. Thus, by associating the flow predictions with the final word of the instruction, the IF stage does not redirect itself before the ID stage has obtained all of the information necessary for correct execution of the instruction.

Referring to FIG. 7, "unaligned" two word branch instructions, rather than being completely contained in one entry, are split across two successive thirty-two bit entries in the system cache 41. Such instructions are sent to the ID stage as portions of two successive transfers over BBL, BBH 62, 63 on two successive pipeline cycles. The ID stage employs its bypass paths to bring the two words together and apply them both to the single instruction they represent. Two successive branch cache 34 locations are referenced in the process of obtaining the two words of this type of instruction. If the redirection were associated with the first word of the two word instruction, the flow of words from the system cache 41 to the ID stage would never include the second word of the instruction, since IRPL would be redirected around it as soon as the branch cache hit was detected on the first word. This would result in incorrect operation since it is necessary to obtain the second word to compute the address of the target of the branch. In the case of an "aligned" two word branch (completely contained in one system cache entry), it does not matter which of the two words has associated with it the redirection command, since they both correspond to a single branch cache location and the actions which need to be taken are identical. The association of the redirection with the second word is therefore tailored to the more difficult "unaligned" case.

Other embodiments of the invention which account for unaligned instructions can be implemented. Thus, if the branch cache were to improperly predict a branch on the first word of an unaligned two word instruction, due to self-modifying code or a variety of other possible special considerations, the situation can be detected by the IF stage, with the help of the special bit used to determine the ODDSIDE signal. Erroneous operation could then be avoided through the use of the erroneous branching avoidance mechanism described below. However, this mechanism is expensive in terms of pipeline cycles, and avoiding the need for it on unaligned branches is advantageous and efficient.

When a branch is predicted, the index and upper bits 1-7 are checked for equality in a comparator 218. If these values match and the signal TAKEBR indicates that the branch should be taken, the signal BCHIT is generated, causing the 16 bit target address (BTARG-1-16) to be loaded into IRPL 33 via selector 32, rather than the normal operation of incrementing IRPL 33. The SPC 9 always sends the contents of the low side of the look-ahead program counter to the IPP 8 through buffer 35 where it is saved in register 217 for later use in validating the prediction. Many conditional instructions in the Prime Instruction Set have branch addresses that are capable of being variable. For example, a conditional instruction could specify a branch to RP+X, where RP=the contents of the program counter and X=the value of the index register. Between the time the branch cache was loaded with a target for a branch instruction and the time the instruction is actually executed, the value of the X register could change. In view of this possibility, the IPP 8 compares branch targets for prefetching in the SPP 9 against the actual calculation of the location that the instruction will branch to if the specified conditions are satisfied. The calculation of the address to which a branch instruction will vector is performed in the same manner as the generation of an address for a data operand. Therefore, the calculation performed in the AG stage of the IP produces the address to which the branch instruction should vector if the specified conditions are met. This address is eventually passed to the EP for use in loading the program counter RP on EX2 11, and for use in reloading IRPL 33 on the IPP 8 if prefetching has not occurred properly, i.e. the branch cache makes an incorrect prediction. The calculated target is available on bus 90 from the last ALU 76 used in the AG stage. The calculated target is compared to the value of the program counter (saved in REG 217), which contains the target prediction from the branch cache that was used to fetch the instruction following the branch instruction. Comparator 219 performs the equality check and indicates whether or not the computed target address of the next instruction matches the target retrieved from the branch cache 34. If the equality is met, the signal GOODBRTARG is generated. Control logic 220 receives instruction classification information from decode net 82 and the BCHIT signal from the SPC 9 and determines whether or not a branch has occurredon a non-branch instruction. If such a branch has occurred, logic 220 generates the signal BREXCPTN. Otherwise logic 220 synchronizes the BCHIT signal from the SPC 9, passing it along with its associated instruction as BRTAKEN.

The signals GOODBRTARG, BRTAKEN, BREXCPTN are transferred to the branch processing hardware 221 in EX1 10 as the branch instruction enters the OE stage. As the branch instruction is executed, a determination of whether or not the branch should occur is loaded into register JCR 301. The output of register JCR 301 together with GOODBRTARG and BRTAKEN are used to generate FLDRP which is used to force a load of RP 128 in EX 2 11 in the event the branch cache mechanism correctly predicted that a branch should be taken.

If the instruction flow has been correctly predicted, regardless of the outcome of the branch instruction, the signal CEXCMPL, indicating that no further execution cycles are required in the EP, is available to the PCU 1, which allows the IP to proceed.

As noted above, a branch instruction can be associated with either the first or second word of a stored thirty-two bit instruction. The IF stage and its associated flow prediction hardware deal with thirty-two bit double words exclusively while the ID stage deals with instructions which may be 1, 2 or 3 words in length. The interaction of these stages and their varying requirements affects branch cache operation.

Referring to the ODDSIDE signal generation noted above, discontinuities in instruction flow are associated with specific jump or branch instructions and not directly with a specific thirty-two bit double word location in the branch cache. These instructions can be one or two words in length and may start at either word within a double word cache cell. The control bit stored in the random access memory is used to record which word in a double word cache pair should be considered to be the branch instruction. The ID stages uses this information to assist it in the determination of whether a valid change in instruction flow has occurred, to control the IF stage, and to appropriately redirect its own instruction buffering and alignment functions as follows.

Referring to FIG. 7, the IF stage obtains thirty-two bit values from the system cache 41 and delivers them to the ID stage over BBH 63 and BBL 62. The IF stage has no knowledge of the nature of the instructions being supplied; it simply sequences through thirty-two bit values (the double words), either sequentially or as directed by the branch prediction hardware.

Referring to FIG. 8, the ID stage receives thirty-two bit data from the IF stage and implements buffering, alignment, and bypassing to handle the various cases of one and two word instructions starting at even and odd word boundaries. These functions are performed using the opcode selector/latch 80, instruction storage register 81, and displacement selector/latch 83.

The ID stage buffering function operates, if redirection by the branch prediction logic does not occur, as follows. If a one word instruction arrives on BBH 63 and passes through the opcode selector/latch 80 to be operated on, the word on BBL 62 is stored in IREG 81 while the first instruction is passing through the ID stage. The IF stage is directed to stop fetching double words for one cycle, since it has fetched more instructions than are presently being consumed by the ID and subsequent stages.

Now suppose the word on BBH is a branch or jump instruction with an associated branch prediction. In this case, the ID stage should not perform buffering at IREG 81 and the associated IF stage holdup functions, but should process the branch instruction and then immediately accept the next pair of words placed on BBH and BBL by the IF stage. Further, the word in IREG is discarded, since it represents an instruction which has been bypassed by the program flow redirection.

Another possibility is that the word on BBH represents a one word non-branch instruction and the word on BBL is a one word branch instruction. At the time these words are supplied to the ID stage, this case looks exactly like the case discussed in the second preceding paragraph. In this case, the buffering at IREG 81 and holdup functions should be performed to allow the instruction preceding the branch to finish, and then the branch stored in IREG 80 should be processed.

In the event that the branch cache mechanism has not correctly predicted program flow, further execution cycles in the EP are necessary. Bus JA 315 transfers the address to the next microstep (from JCR 301) thereby specifying which type of branch cache modification is to be performed.

Modifications may be one of two categories for branch-type instructions, depending on the probability of correct prediction of branches. For both predictable and non-predictable instructions, if the instruction is incorrectly predicted to branch, the branch cache 34 is updated by removing the prediction while permitting the "bad" target address to remain.

If a branch occurs which has not been predicted on an instruction type which is classified as "predictable" (such as a Jump or Branch instruction), the branch cache 34 is updated during the ensuing execution cycles by inserting a prediction and associated target address. The newly inserted target address, which is the calculated address of the branch instruction, is transferred from selector 127 by way of BDL bus 54 to branch cache 34.

Referring now to FIG. 11, the operation of adding an instruction redirection to the branch cache works as follows. When the address of the non-predicted branch instruction is loaded into IRPL 33 by the microcode, after detection of a non-predicted branch, bits 8-15 are used to address the appropriate branch cache 34 location, the "TAKE BRANCH" bit is set, the target of the branch is stored, and the index is set to the value of bits 1-7 of the IRPL. In addition, bit 16 of the IRPL is stored in the branch cache (the ODDSIDE signal) to indicate with which of the two possible words the branch prediction is associated. This bit is provided to the ID stage on subsequent transfers of the normally read double word length data (corresponding to this branch cache location) from the IF stage and serves to differentiate between the two cases described above. In this manner the ID stage can decide between the two possible courses of action.

When the branch is correctly predicted, but the target address does not match the calculated target address, the prediction remains in the branch cache 34 but a new target address (corresponding to the calculated address) is inserted.

If a branch occurs which has not been predicted for instruction types which are not classified as "predictable" (such as Skip), no updating is made in the branch cache 34.

When a branch is incorrectly predicted for an instruction which is not a branch-type instruction, the signal BREXCPTN forces execution of a microcode routine not associated with any particular instruction which removes the incorrect prediction category. In all cases of an incorrect prediction, the look-ahead program counter IRPL 33 is reloaded and the PCU 1 is notified to flush the pipeline.

An incorrect branch can occur because the branch prediction device supplies only a prediction and does not wait for instruction decode to make its determinations. A redirection cannot be detected as incorrect until such time as the instruction has been completely decoded by the ID and AG stages, and has actually commenced execution in the OE stage. At this point, the pipeline control hardware traps the microcrode to a special routine which locates and removes the erroneous entry as described above, and reinitializes the pipeline so that the undesired redirection is eliminated.

In particular, referring again to FIG. 11 and FIG. 1A, the IF stage 2 makes its branch decisions autonomously. The IF stage then informs the ID and AG stages 3,4 of its determination simultaneous to the delivery of instructions from the IF stage to the ID stage. The ID stage decodes the instruction and also records the branch determination. During the time that the AG stage prepares the effective address, the AG stage decides whether it is acceptable to allow the instruction to proceed through microcode execution in the OE and ES stages 6,7. The microcode for non-branch instructions is not prepared to handle the possibility of an instruction redirection. If the AG stage determines that this situation has occurred, it prevents the instruction from proceeding to the ES stage, and instead directs the CF stage 5 to transfer control to a special microcode routine which corrects the problem. This operation is carried out as follows.

The microcode obtains the true program counter (maintained by the ES stage) and transfers it over BDL 54 through buffer 31 and selector 32 to IRPL 33. (The current value of IRPL is useless, because it reflects the redirection erroneously taken). The contents of the appropriate location in the branch cache 34 addressed by the IRPL, now reflecting the original count when the erroneous decision was made, is invalidated (by the microcode writing a zero into the "TAKE BRANCH" bit stored with the data.) This ensures that the branch cache will no longer make the erroneous prediction. The microcode then directs the pipeline control unit to refill the pipeline with correctly fetched instructions.

REGISTER BYPASS

Figure 12:
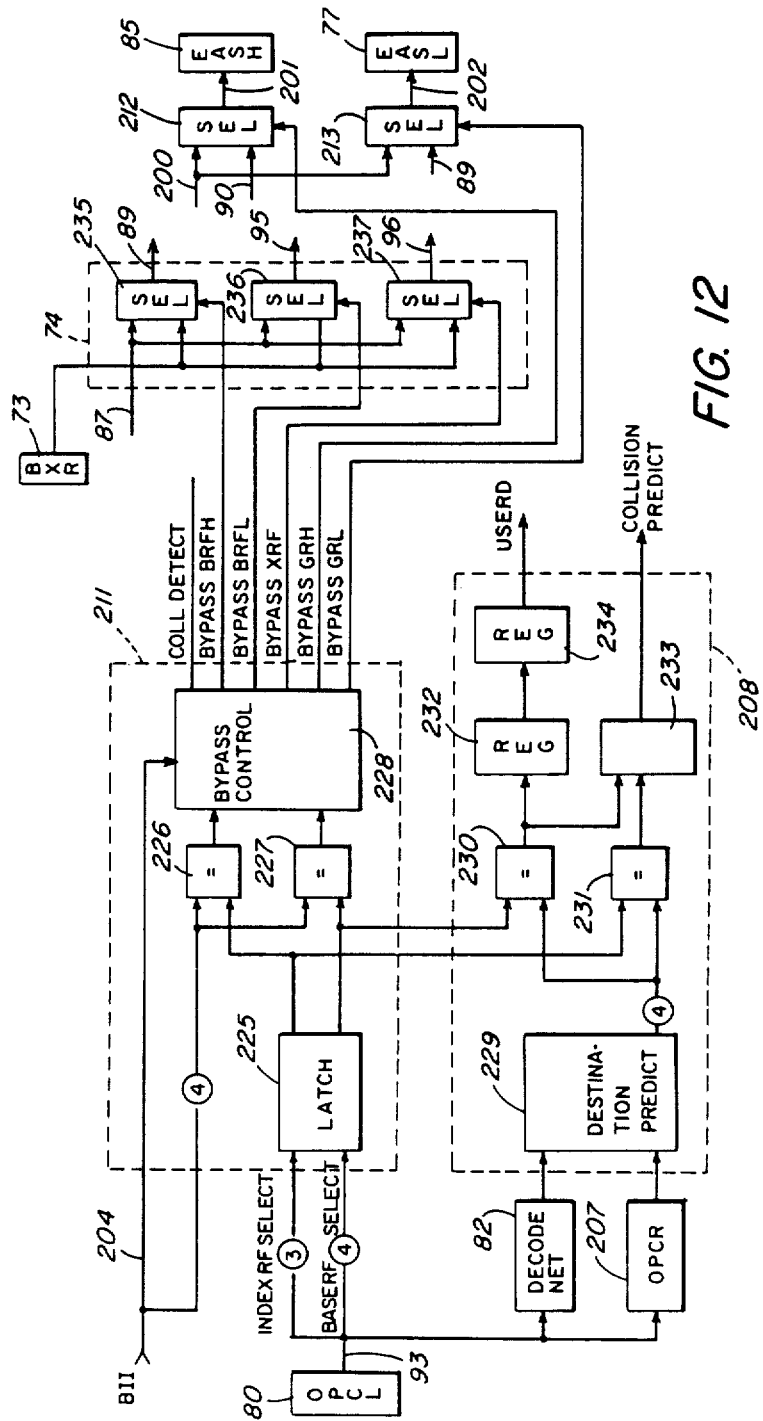
FIG. 12 shows, in block diagram form, the register bypass network of the Instruction Pre-Processor of FIG. 8.

The register bypass network is shown in detailed form in FIG. 12. In the present embodiment, the register bypass network is located principally on IPP 8. In the present pipelines system, simultaneous access to certain registers is often required by two or more different stages of the pipelines. For example, many instructions require prefetching of certain registers early in the pipeline sequence so that they may be used in the generation of data (operand) addresses for accessing the program storage. Other instructions require prefetching of a register value which is used directly as an operand. Register values used for generating addresses, or directly as operands are typically modified by execution stages placed late in the pipeline.

With this type of processor, instruction "collisions" may occur when two instructions, one prefetching a register and one writing it, are too close to each other in the instruction flow. In this situation, the write which happens in a late stage may not actually be done until later in time than the prefetch read, even though the writing instruction comes before the reading one in the program.

The register bypass network accommodates hardware which handles collisions between an instruction reading a register in an operand prefetch stage of the pipeline and another instruction modifying the same register in an execution stage which may be employed to modify many registers during one instruction through repeated execution cycles. The register bypass network further accommodates different types of collision using variations of bypassing techniques. If a collision occurs on instructions which are well separated, a bypass selector and associated storage for saving the bypass value are sufficient, together with address comparison hardware. As the two instructions move closer together and the prefetched register is being used to form an operand address, the pipeline control unit PCU 1 forces separation of the instructions; however, this separation only occurs if a collision is either detected or at least predicted. The register bypass further provides routing bypass data back to different stages of the pipeline depending on the relative separation in cases where register prefetching is only occurring on behalf of register operands rather than register-related operand address formation. In the register bypass network of FIG. 12, a pair of registers are fetched for each memory referencing instruction. These registers are termed "base register" and "index register", and are shown as AGRF 72 in FIG. 8. The base and index register are added together by ALU 75 in the AG stage of the instruction fetch pipeline, thence added to a displacement resulting in an operand address.

Another instruction form requires that the value of a "general register" be supplied directly as an operand. This operand is fetched from the same register file as is used for the base registers described above, and is transported without modification through the AG stage and supplied to the OE stage.

Current values for base, index, and general registers are supplied by the ES stage as it executes microcode instructions which modify them. The ES stage can modify all 32 bits of a register, or either of its 16 bit halves. Since the ES stage completes its operations three stage times later than completion of the corresponding ID stage, there are three different collisions possible:

(1) Modification and use separated by three or more cycle times. In this case, an instruction has completed the ID phase and waits for completion of the terminal microcode step of the preceding instruction before continuing through the AG phase. An index and base register have been fetched from the AG Register file 72, transferred through pipeline register BXR 73 and stored in selector/latch 74. The register file destination address specified by each microcode step and supplied by BII 204 is continuously compared (by comparators 226 and 227) with the base register and index register addresses used on behalf of the instruction awaiting in the AG stage and stored in latch 225. The outputs of these comparators, together with write enables supplied by BII, are passed through bypass control logic 228 for determination of the needed action.

If a match occurs, the data in selector/latch 74 is stale, and correct data must be substituted. The appropriate portions of selector/latch 74 are reclocked, selecting the updated value coming from the ES stage via BD 50, 54, buffers 210 and pipeline register BDR 71. Sufficient time exists in this case for the updated values to retraverse the AG stage, so no additional delay is necessary. This same mechanism is employed for equivalent cases involving general registers used as operands.

(2) Modification and use separated by two cycle times. In this case the AG phase is attempting to proceed (the final microcode step of the preceding instruction is beginning) and the previous microcode step modified an index or base register used by the instruction active in the AG phase. The same monitoring hardware used for 1 remains effective due to latch 225, which holds the index and base register addresses long enough for this final determination. In the event of collision detection, the proper bypass is again selected at selector/latch 74, but in this case extra time must be added for the AG phase to properly employ the new value. The Collision Detect signal, produced by control logic 228, directs the PCU to allow the ES stage to complete while stopping all other pipeline stages. In this fashion the new value is obtained and a one cycle time delay provided for the AG phase to make use of it.

It is undesirable to incur this time delay where registers are used directly as operands. Since this type of operand need not be manipulated by ALU's 75 and 76, it is possible to skip over these pipeline stages and send the data directly where it's needed. This is accomplished via selectors 212 and 213, which select the modified portion of the value presently on busses BD 50, 54 for insertion into the data stream in place of the stale value being produced on busses 89 and 90. In this manner, no extra time is required.

(3) Modification and use separated by one cycle time. When two successive machine instructions result in this situation, the method used in (1) and (2) is not effective, because the instruction with the stale data must exit the AG stage before the register file destination address of the modifying instruction is available. The destination predictor logic, consisting of a portion of the decode net 82, certain saved opcode bits 207 and control logic 229, is used to determine which register, if any, might be modified in the final microcode step of an instruction. This requires some care in the selection of microcode algorithms, but the flexibility resulting from storage of control bits in the decode net makes this task straight-forward.

The output of the destination predictor logic is compared with the index and base register addresses used by the next instruction by comparators 230 and 231. The outputs of the comparators travel through control logic 233, which generates the Collision Predict signal. When asserted, this signal instructs the PCU to allow the instruction doing the modification to proceed, while holding the next instruction's AG stage (and all subsequent instructions). This separates the two instructions by two cycles instead of one cycle, and the hardware of case (2) above can then take over. This logic may or may not insert its one cycle delay, depending on whether the collision actually occurs.

The need for a register bypass, however, cannot be determined directly from the ES stage in the case of immediately adjacent instructions. It is possible to make a reasonably accurate determination of what register (if any) will be modified by an instruction by examining the opcode bits and the destination register tag bits of the instruction. Ready access to microcode algorithm related information can be obtained by storing opcode related information in the instruction decode net. Once the microcode for an assembly language instruction has been written, a determination is made of the register most likely to be modified by a terminal microcode step. This information is then stored in a storage element which makes up part of the decode net, and all paths through the microcode are checked to ensure that they place a copy of this register in RD 122 for bypassing (should bypassing be needed for the next instruction).

The AG stage then checks the next previous instruction (presently in the ID stage) to see if a collision condition exists. In the event of a collision on an index or base register, the IF and ID stages of the pipeline are held up one cycle; allowing time for the normal collision detection and resolution hardware (of case 2) to take over. (If the collision involves a general register, then the pipeline is not held up and the automatic OE stage bypassing is invoked as described below.)

In particular, referring to FIG. 12, instructions are transported through the opcode latch 80 and are decoded by decode network 82. Instruction specific information is passed to the destination register prediction control logic 229 which either produces a prediction of the likely destination register or states that no register will be modified. The prediction is compared by comparators 230 and 231 with the addresses of the index and base registers fetched on behalf of the next instruction. This result passes through additional logic 233 which determines whether a collision has actually occurred (the pipeline may be refilling or the next instruction may not actually use the index register fetched for it). Referring to FIG. 3A, when the IPP 8 (through logic 233) produces the collision predict signal COLPRED as described above, the pipeline control unit (PCU) receives the signal, stops the IF, ID, and AG stages, and allows the CF, OE, and ES stages to cycle. The PCU also supplies the signal FORCENOP which operates on the LDA generator 84 (FIG. 8) and modifies the microcode address on the LDA bus 91 to the address of a special "stall" step, which acts as a placeholder for the CF stage while the necessary one cycle separation between the two instructions is being inserted. This one cycle separation, as noted above, is sufficient to allow the balance of the logic illustrated in FIG. 12 to take over and perform bypassing, if needed, or supply any additional delay(s) that may be required.

The "prediction" aspect is based solely on the use of instruction opcodes. In a complex instruction set architecture, there are many instructions which can write more than one register, or which might not modify the predicted destination register in all cases. (Divide by zero is an example.) By stipulating one "likely" register in a microcode algorithm, (and then not modifying any different register in the final microinstruction of the algorithm), and then recording this "likely" destination in the decode network, the IPU is able to make a determination which will result in the necessary delay in all cases where it is definitely necessary, never adds delays which are known to be unnecessary for an instruction, and adds a minimum delay in certain unlikely cases.

Once the hardware performs its function, any necessary separation will have been introduced to allow the microcode specified register destinations to be monitored by the logic in FIG. 12 as described in case (2) above.

It is again undesirable to apply time penalities when registers are used as operands. When a match is detected by comparator 230 and a general register is being fetched, this condition is remembered in register 232. This is in turn pipelined in Register 234 and sent over to the OE stage hardware as the signal USERD, where it acts as a form of extended control over the operand source select microcode field. When such a collision occurs, this extended control forces selection of the needed operand from an alternative source in the instruction execution pipeline. This extra copy is kept valid by microcode convention, and again no time penalty is required.

As noted above, for certain classes of instructions, a register is used directly as an operand, instead of as an input towards the generation of the effective address of an operand. In this case, the (register) operand does not need to be manipulated by the AG stage, but rather is supplied unmodified to the OE stage. For maximum efficiency, it is important to make instructions of this type as fast as possible. When a register modification occurs in the microinstruction which immediately precedes the initiate step for the next assembly-language-level instruction, it is not possible for the AG stage to provide the operand without an undesirable extra pipeline delay.

The mechanism by which the OE stage can transparently provide its own operand, however, through a hardware override of its data path control logic and using a microcode convention which ensures that the required data is available within the OE stage, in a form that can be substituted directly for what would have been provided by the AG stage, is as follows.

Any microcode algorithm which modifies a general register on what could be the last microcode step prior to commencement of the next assembly language instruction must ensure that a thirty-two bit copy of the resultant data is placed in the microcode scratch register RD 122 (FIG. 10) during or before the final step. This data can then be substituted for the (stale) data provided by the AG stage, should the next instruction reference the same register.

In operation, the ID stage ordinarily fetches the desired register operand from the AG register file 72 and stores it through the BXR pipeline register 73. The AG stage transports it through the selector/latch 74 through ALUs 75 and 76, selectors 212 and 213, and stores it in registers EASH 85 and EASL 77. The OE stage can then obtain the operand by using the microcode field to direct that EAS be transported through selectors 86 and 78 and placed on BBH 63 and BBL 62.

If the immediately succeeding instruction modifies the desired register and operand, neither of the selectors can obtain the data in time of effect the needed bypass. The value in EASH 85 and EASL 77 is "stale" and does not reflect the update. Rather than waiting for the new value to arrive, (and thus undesirably holding up the OE stage), the AG stage detects this condition and records its occurrence along with storing the "stale" data. This function is performed by logic depicted in FIG. 12, specifically the decode net 82, opcode register 207, comparator 230, pipeline register 232, and collision record register 234 as noted above. The signal "USERD" is sent to the OE stage to inform it of this situation.

Figure 10:
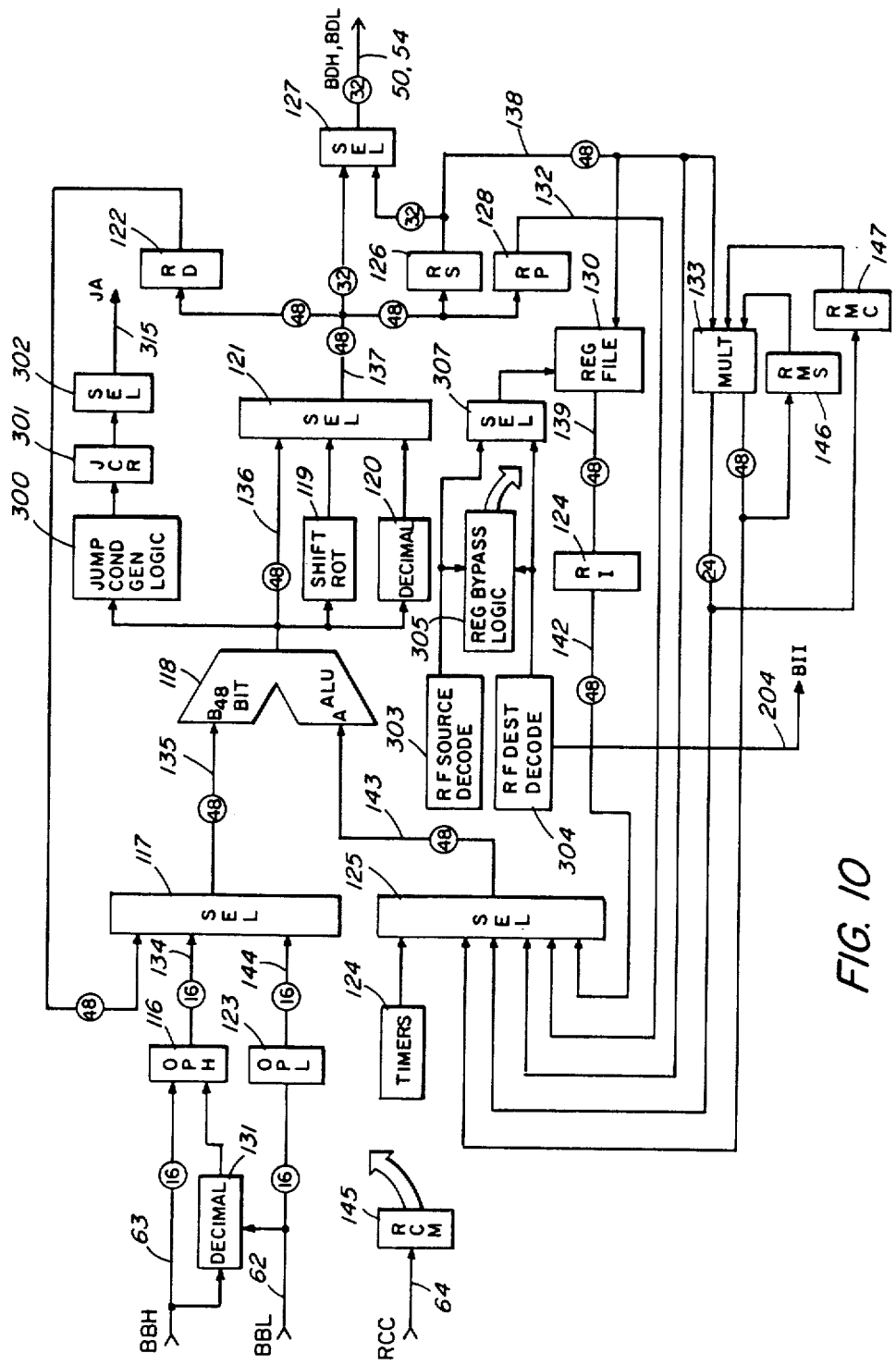
FIG. 10 depicts a combined block diagram of the two Execution units of FIG. 1A.

Referring now to FIG. 10, the USERD signal acts as a control input (not shown) to the selector 117, and forces it to substitute the contents of register RD 122 for the stale data present on BBH 63 and BBL 62. The contents of RD 122 are guaranteed to be an appropriate substitute by the microcode restriction stated above.

The invention may be embodied in other specific forms without departing from the spirit or essential characteristics thereof. The described embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A data processing system for processing a sequence of program instructions comprising
    an instruction pipeline having a plurality of serially operating instruction stages for reading instructions from storage and for forming therefrom a first and a second data for use during the execution of said instructions, said instruction pipeline including at least an operand address generation stage for generating operand addresses,
    an execution pipeline connected to said instruction pipeline and having a plurality of serially operating execution stages for receiving said data and for employing said data formed by said instruction pipeline for executing said instructions, said execution pipeline including a control formation stage for accessing and distributing control information,
    a pipeline control unit connected to said instruction pipeline and said execution pipeline for synchronously operating said instruction pipeline and said execution pipeline, said pipeline control unit including
        means for initiating operation of at least one stage of said execution pipeline using said first data formed by said instruction pipeline for a program instruction prior to the completion of said second data formation by said instruction pipeline for said program instruction,
    whereby operation of at least said address generation stage and said control formation stage of said respective pipelines overlap for each program instruction.

2. The data processing system of claim 1 further comprising
    a high speed random access memory,
    a pipeline master clock for timing said pipeline stages,
    said pipeline control unit connected to said clock and having means for providing at least two clocked periods for each said pipeline stage to complete its operation,
    means for connecting said execution pipeline and said instruction pipeline to said memory, and
    for each said at least two clocked periods, said instruction pipeline having access to said high speed memory during one of said clocked periods and said execution pipeline having access to said high speed memory during another one of said clocked periods.

3. The data processing system of claim 1 wherein said pipeline control unit further comprises
    means responsive to exception conditions on said execution and said instruction pipelines for independently controlling, for each pipeline, the flow of instruction operations through said execution pipeline and said instruction pipeline.

4. The data processing system of claim 3 wherein said flow control means includes means for halting operation of one of said execution and instruction pipelines independently of the other pipeline.

5. The data processing system of claim 1 wherein said instruction pipeline comprises
    an instruction fetch stage for accessing from memory program instructions to be performed,
    an instruction decode stage for generating, from said accessed instructions, (a) starting addresses in a microcode storage element and (b) operand address data, and
    wherein said operand address generation stage includes means for generating operand addresses from said operand address data.

6. The data processing system of claim 5 further comprising a register file and further wherein said control formation stage includes means for accessing microinstructions from said microcode storage element, using said starting addresses, and for buffering said microinstructions for use by said execution pipeline, and wherein execution pipeline comprises
    an operand execute stage for accessing, using said operand addresses and register file controls, operand data to be operated upon and, using said operands and a said microinstruction, initiating execution of said instruction, and
    an execution and store stage for completing said execution of said microinstruction and for making results of said execution available over output lines thereof to said system.

7. The data processing system of claim 6 wherein said operation initiating means begins operation of said control formation stage for a program instruction at a time prior to completion of operation of said operand address generation stage for said program instruction.

8. The data processing system of claim 6 wherein the pipeline control unit further comprises
    means operative in response to said microinstructions for altering the flow of instructions in at least one said instruction pipeline and said execution pipeline.

9. The data processing system of claim 8 wherein said altering means is responsive to a said microinstruction, said altering means being operative for extending the operating time duration of all stages, except the execute and store stage, for allowing the operand execute stage to complete a process operation.

10. The data processing system of claim 8 wherein said altering means is responsive to a said microinstruction, said altering means being operative for inhibiting operation of said instruction pipeline for allowing said execution pipeline to cycle through a plurality of microinstructions.

11. The data processing system of claim 8 wherein said pipeline control unit further comprises
    means for inserting no-operation cycles into the execution pipeline in the event that at least one of (a) there being no instruction from the instruction decode stage of the instruction pipeline for the control formation stage of the execution pipeline and (b) there being no instruction from the address generation stage of the instruction pipeline for the operand execution stage of the execution pipeline, occurs.

12. The data processing system of claim 8 wherein said altering means is responsive to a conditional branch microinstruction entering said operand execute stage and said altering means further comprises means for operating said operand execute and execution and store stages, and means for inhibiting operation of said instruction pipeline and said control formation stage, until data required by said conditional branch microinstruction is available from said operand execute stage.

13. The data processing system of claim 6 wherein said instruction pipeline comprises a look-ahead program counter, and further wherein said pipeline control unit comprises means, responsive to a said microinstruction, for redirecting instruction flow in said instruction pipeline by effecting reloading of said instruction pipeline look-ahead program counter.

14. The data processing system of claim 13 wherein said execution pipeline includes a microcode storage element, and further wherein said pipeline control unit, in response to a request by the execution pipeline, causes discarding of all current instructions in the instruction pipeline.

15. The data processing system of claim 6 further comprising means for detectig collisions between read data from a register associated with the instruction pipeline operation in response to a first instruction, and write data written in registers associated with the execution pipeline operation in response to an earlier instruction, wherein said execution pipeline operation can include a plurality of execution cycles for an instruction during each of which a register can be modified and wherein said first instruction requires one of said modified values to continue valid operation, said detecting means comprisig means for storing said modified values generated during the execution pipeline operation and the write register address associated therewith, means for comparing the associated write register address of each modified value with the read register address used by the instruction pipeline, means for directing, when said addresses match, the modified value to be written at said register address to replace the data previously designated for use during said instruction pipeline operation.

16. The data processing system of claim 15 wherein said storage means receives data from the execution and store stage, said read register address is a read address generated by the instruction decode stage, said write register address is available to the pipeline during operation of the execution and storage stage, and said directing means comprises a selector means connected between the instruction decode and address generation stages, said selector having the read data and the modified value as inputs thereto.

17. The data processing system of claim 15 wherein said directing means further comprises a second selector means connected between the address generation stage and the operand execute stage for altering at least a portion of the flow of address data to said operand execute stage in response to a collision detection signal.

18. The data processing system of claim 5 comprising means for detecting an exception condition during operation of said instruction fetch stage, and further wherein said pipeline control unit comprises means for holding an instruction in said instruction fetch stage until all other stages of said instruction and execution pipelines have completed processing instructions therein.

19. The data processing system of claim 5 further comprising a high speed instruction storage element, means connecting to said element for reading from said element two instruction words at a time, said two words being aligned with an even word boundary of said memory, and access means connecting to said element for reading from said element a two word instruction aligned with an odd word boundary, said access means comprising means for reading a first word of said two word instruction during the instruction fetch phase of said instruction, said first word including all instruction decode data, and means for reading a second word of said instruction during the instruction fetch phase of a next following instruction.

20. The data processing system of claim 1 further comprising a microcode storage element for storing microinstructions, means for connecting the execution pipeline to the storage element, and said execution pipeline effects data manipulation in response to selected ones of the microinstuctions.

21. The date processing system of claim 1 wherein said execution pipeline includes a microcode storage element, and further wherein said pipeline control unit, in response to a request by the execution pipeline, discards all current instructions in the instructin pipeline.

22. The data processing system of claim 21 wherein said pipeline control unit further comprises means for inserting no-operation cycles into the execution pipeline during the time duration that the instruction pipeline is refilling, and for continuing operation of said execution pipeline while said instruction pipeline is refilling.

23. The data processing system of claim 1 comprising means connected to the instruction and execution pipelines for detecting pipeline collisions in said instruction and execution pipelines, and further wherein the pipeline control unit comprises means, responsive to said collision detecting means, for delaying operation of at least one of said stages for introducing a separation between colliding instructions.

24. A pipeline control method for a data processing system for processing a sequence of program instructions, said system comprising an instruction pipeline having a plurality of serially operating instruction stages for reading instructions from storage and for forming therefrom address data for use during execution of said instructions, said instruction pipeline including at least an operand address generation stage for generating operand addresses, an execution pipeline having a plurality of serially operating execution stages for receiving said address data and for employing said address data formed by said instruction pipeline for referencing stored data to be employed for executing said instructions, said execution pipeline including a control formation stage for accessing and distributing control information, the pipeline control method comprising the steps of synchronously operating said instruction pipeline and said execution pipeline, and initiating operation of at least said control formation stage of said execution pipeline using at least one said address data formed by said instruction pipeline for a program instruction prior to the completion of said address operand generation by said address generation stage for said instruction.

25. The pipeline control method of claim 24 further comprising the steps of providing at least two clocked periods for each pipeline stage to complete its operation, and sharing a high speed memory between said instruction pipeline and said execution pipeline, said instruction pipeline having access to said high speed memory during one of said clocked periods and said execution pipeline having access to said high speed memory during another one of said clocked periods.

26. The pipeline control method of claim 24 further comprising the step of independently controlling, for each pipeline, the flow of instruction operations through said respective execution and instruction pipelines.

27. The pipeline control method of claim 26 wherein said controlling step further comprises the step of halting operation of one only of said execution and instruction pipelines in response to pipeline control conditions.

28. The pipeline control method of claim 24 further comprising the steps of detecting pipeline collisions in said instruction and execution pipelines, and delaying operation of at least a portion of said instruction pipeline for introducing a separation between said colliding instructions.

29. A data processing system for processing a sequence of program instructions comprising an instruction pipeline having a plurality of serially operating instruction stages for reading instructions from storage and for forming therefrom plural address data for use during execution of said instructions, an execution pipeline connected to said instruction pipeline and having a plurality of serially operating execution stages for receiving said address data and for employing said address data formed by said instruction pipeline for referencing stored data to be employed for executing said instructions, a pipeline control unit connected to said execution pipeline and said instruction pipeline for operating said instruction pipeline and said execution pipeline, said pipeline control unit including means responsive to exception conditions on said execution and said instruction pipelines for independently controlling, for each pipeline, the flow of instruction operations through said execution pipeline and instruction pipeline.

30. A data processing system for processing a sequence of program instructions comprising an instruction pipeline having a plurality of serially operating instruction stages for reading instructions from storage and for forming therefrom plural address data for use during execution of said instructions, an execution pipeline connected to said instruction pipeline and having a plurality of serially operating execution stages for receiving said address data and for employing said address data formed by said instruction pipeline for referencing data storage locations to be employed for executing said instructions, a pipeline control unit connected to said execution pipeline and said instruction pipeline for synchronously operating said instruction pipeline and said execution pipeline, said pipeline control unit including a plurality of state registers, a plurality of combinatorial logic circuits, one each of said state registers and said logic circuits being associated with each stage of said pipelines, each said logic circuit having a first signal output and a second signal output, each pipeline stage having a first phase of operation in time association with said first signal output of said associated logic circuit and a second phase of operation in time association with said second signal output of said associated logic circuit, each said logic circuit and associated state register, associated with the same pipeline, being connected in series, and at least one of said logic circuits being connected to receive condition signal from said pipelines for controlling the flow of instructions through said pipeline.

31. The data processing system of claim 30 further comprising means for connecting said first signal output of a logic circuit to the associated state register for determining when the associated pipeline stage has completed a first phase of operation.

32. A data processing system for processing a sequence of program instructions comprising an instruction pipeline having a plurality of serially operating instruction stages for reading instructions from storage and for forming therefrom at least first and second address data for use during execution of said instructions, said instruction pipeline including at least an operand address generation stage for generating operand addresses, an execution pipeline connected to said instruction pipeline and having a plurality of serially operating execution stages for receiving said address data and for employing said address data formed by said instruction pipeline for referencing data storage locations to be employed for executing said instructions, said execution pipeline including a control formation stage for accessing and distributing control information, a pipeline control unit connected to said instruction pipeline and said execution pipeline for synchronously operating said instruction pipeline and said execution pipeline, said pipeline control unit including means for initiating operation of at least one stage of said execution pipeline using said first address data formed by said instruction pipeline for a program instruction prior to the completion of said second address data formation by said instruction pipeline for said program instruction, whereby operation of at least said address generation stage and said control formation stage of said respective pipelines overlap for each program instruction.

* * * * *